US012637034B2

(12) United States Patent
Kemppainen

(10) Patent No.: US 12,637,034 B2
(45) Date of Patent: May 26, 2026

(54) LANDING GEAR ASSEMBLY

(71) Applicant: SAF-Holland, Inc., Muskegon, MI (US)

(72) Inventor: Jeffrey S. Kemppainen, Kent City, MI (US)

(73) Assignee: SAF-Holland, Inc., Muskegon, MI (US)

( * ) Notice: Subject to any disclaimer, the term of this patent is extended or adjusted under 35 U.S.C. 154(b) by 686 days.

(21) Appl. No.: 18/189,576

(22) Filed: Mar. 24, 2023

(65) Prior Publication Data

US 2023/0303039 A1    Sep. 28, 2023

Related U.S. Application Data

(60) Provisional application No. 63/369,704, filed on Jul. 28, 2022, provisional application No. 63/362,017, filed on Mar. 28, 2022.

(51) Int. Cl.
B60S 9/04 (2006.01)
(52) U.S. Cl.
CPC ..................................... B60S 9/04 (2013.01)
(58) Field of Classification Search
CPC .... B60S 9/004; B60S 9/00; B60S 9/12; B60S 9/18
See application file for complete search history.

(56) References Cited

U.S. PATENT DOCUMENTS

| | | | |
|---|---|---|---|
| 2,499,625 A | 3/1950 | Black | |
| 3,077,120 A | 2/1963 | Viehweger, Jr. | |
| 3,259,364 A | 7/1966 | Hulverson et al. | |
| 4,483,515 A | 11/1984 | Maryonovich | |
| 5,538,225 A | 7/1996 | VanDenberg | |
| 5,676,018 A | 10/1997 | Vandenberg | |
| 6,446,937 B1 | 9/2002 | Straw et al. | |
| 6,846,016 B2 | 1/2005 | Vandenberg et al. | |
| 6,926,261 B1 | 8/2005 | Renshaw | |
| 6,994,325 B2 | 2/2006 | Riedl | |
| 7,258,363 B2 | 8/2007 | Baxter | |
| 7,398,959 B2 | 7/2008 | Vandenberg et al. | |
| 7,798,034 B2 | 9/2010 | Drake | |

(Continued)

FOREIGN PATENT DOCUMENTS

| | | |
|---|---|---|
| CN | 205971245 U | 2/2017 |
| CN | 106627519 A | 5/2017 |

(Continued)

OTHER PUBLICATIONS

Supplementary European Search Report; The Hague; Jun. 2, 2025; entire document.

*Primary Examiner* — Lee D Wilson
(74) *Attorney, Agent, or Firm* — Price Heneveld LLP

(57) ABSTRACT

A landing gear assembly configured to support a trailer includes a leg assembly including first and second leg members, a gear assembly coupled to the leg assembly and configured to move the first leg member between retracted and extended positions, wherein the gear assembly includes a first shaft member and a first gear where the first shaft member and the first gear are a single, integral piece, first and second bushing members each including a bushing portion having a bushing portion and a closed end and rotatably supporting ends of the first shaft member within the first leg member.

20 Claims, 23 Drawing Sheets

(56)                    References Cited

U.S. PATENT DOCUMENTS

| | | | |
|---|---|---|---|
| 8,051,545 B2 | 11/2011 | Peveler | |
| 8,136,840 B2 | 3/2012 | Riedl | |
| 8,276,941 B2 | 10/2012 | Riedl | |
| 8,967,667 B2 | 3/2015 | Weber | |
| 9,598,057 B2 | 3/2017 | Oestreich et al. | |
| 11,148,645 B2 | 10/2021 | Hicks et al. | |
| 11,772,947 B1 * | 10/2023 | Huang | B66F 3/44 |
| | | | 254/103 |
| 12,325,387 B2 * | 6/2025 | Kemppainen | B60S 9/08 |
| 12,377,819 B2 * | 8/2025 | Kemppainen | B60S 9/04 |
| 2005/0202923 A1 | 9/2005 | Drake, III | |
| 2006/0119089 A1 | 6/2006 | Rivers et al. | |
| 2008/0222872 A1 | 9/2008 | Peveler | |
| 2008/0315570 A1 | 12/2008 | Baxter | |
| 2013/0187106 A1 | 7/2013 | Birkholz et al. | |
| 2014/0131986 A1 | 5/2014 | Riedl | |
| 2015/0224838 A1 | 8/2015 | Laarman et al. | |
| 2020/0238957 A1 * | 7/2020 | Jasper | B60S 9/08 |
| 2023/0242083 A1 * | 8/2023 | Hicks | H02K 11/28 |
| | | | 254/419 |
| 2023/0303038 A1 * | 9/2023 | Kemppainen | B60S 9/08 |
| 2023/0303039 A1 * | 9/2023 | Kemppainen | B60S 9/08 |
| 2023/0322192 A1 * | 10/2023 | Kemppainen | B60S 9/04 |
| | | | 254/419 |
| 2024/0278750 A1 * | 8/2024 | De Boer | B60S 9/08 |

FOREIGN PATENT DOCUMENTS

| | | | | |
|---|---|---|---|---|
| CN | 111547017 A | 8/2020 | | |
| WO | 2004087475 A1 | 10/2004 | | |
| WO | 2004096606 A2 | 11/2004 | | |
| WO | 2007095529 A2 | 8/2007 | | |
| WO | 2018227905 A1 | 12/2018 | | |
| WO | 2020055399 A1 | 3/2020 | | |
| WO | WO-2023192169 A1 * | 10/2023 | | F16H 57/023 |

* cited by examiner

1

LANDING GEAR ASSEMBLY

CROSS-REFERENCE TO RELATED APPLICATIONS

This application is a continuation of U.S. patent application Ser. No. 18/189,557, entitled "LANDING GEAR ASSEMBLY," filed Mar. 24, 2023, which claims priority to U.S. Provisional Patent Application No. 63/362,017, entitled "LANDING GEAR ASSEMBLY," filed Mar. 28, 2022 and U.S. Provisional Patent Application No. 63/369,704, entitled "LANDING GEAR ASSEMBLY," filed Jul. 28, 2022, the entire disclosures of which are incorporated herein by reference.

BACKGROUND OF THE INVENTION

The embodiments as disclosed herein relate to a landing gear assembly for heavy-duty commercial trucks such as semi-trailers, and specifically to a landing leg assembly that includes a gear arrangement operable to move the landing gear assembly between a retracted position and an extended position, and where the gear arrangement includes various configurations of bolt-on bushing arrangements.

SUMMARY OF THE INVENTION

One embodiment as shown and described herein includes a landing gear assembly configured to support a trailer where the landing gear assembly may include a leg assembly including a first leg member and a second leg member telescopingly received within the first leg member and adjustable between a retracted position and an extended position, a gear assembly operably coupled to the leg assembly and configured to move the first leg member between the retracted and extended positions, wherein the gear assembly includes a first shaft member, and a first bushing member rotatably supporting a first end of the first shaft member within the first leg member, wherein the first bushing member is attached to the first leg member via at least one first mechanical fastener, and wherein the first bushing member comprises a powdered metal.

Another embodiment as shown and described herein may further or alternatively include a landing gear assembly configured to support a trailer where the landing gear assembly may include a leg assembly including a first leg member and a second leg member telescopingly received within the first leg member and adjustable between a retracted position and an extended position, a gear assembly operably coupled to the leg assembly and configured to move the first leg member between the retracted and extended positions, wherein the gear assembly includes a first shaft member, and a first bushing member directly supporting a first end of the first shaft member for rotational movement within the first leg member, wherein the first bushing member is attached to the first leg member via at least one first mechanical fastener, and wherein the first bushing member is a single, integral piece.

Yet another embodiment as shown and described herein may further or alternatively include a landing gear assembly configured to support a trailer where the landing gear assembly may include a leg assembly including a first leg member and a second leg member telescopingly received within the first leg member and adjustable between a retracted position and an extended position, a gear assembly operably coupled to the leg assembly and configured to move the first leg member between the retracted and extended positions, wherein the gear assembly includes a first shaft member, a first bushing member having a bushing portion and a plate portion rotatably supporting a first end of the first shaft member within the first leg member, wherein the first flanged cap bushing member is attached to the first leg member via at least one first mechanical fastener, and wherein the first flanged cap bushing member is a single, integral piece, and a second flanged cap bushing member rotatably supporting a second end of the first shaft member within the first leg member, wherein the second flanged cap bushing member is attached to the first leg member via at least one second mechanical fastener, and wherein the second flanged cap bushing member is a single, integral piece.

Still yet another embodiment as shown and described herein may further or alternatively include a landing gear assembly configured to support a trailer where the landing gear assembly may include a leg assembly including a first leg member and a second leg member telescopingly received within the first leg member and adjustable between a retracted position and an extended position, a gear assembly operably coupled to the leg assembly and configured to move the first leg member between the retracted and extended positions, wherein the gear assembly includes a first shaft member, a first bushing member directly supporting a first end of the first shaft member for rotational movement within the first leg member, wherein the first bushing member is attached to the first leg member via at least one first mechanical fastener, and a second bushing member directly supporting a second end of the first shaft member for rotational movement within the first leg member, wherein the second bushing member is attached to the first leg member via at least one second mechanical fastener.

Another embodiment as shown and described herein may alternatively or further include a landing gear assembly configured to support a trailer where the landing gear assembly may include a leg assembly including a first leg member and a second leg member telescopingly received within the first leg member and adjustable between a retracted position and an extended position, a gear assembly operably coupled to the leg assembly and configured to move the first leg member between the retracted and extended positions, wherein the gear assembly includes a first shaft member having a first longitudinal axis and second shaft member having a second longitudinal axis offset from the first longitudinal axis, and a single-piece bushing plate having a first bushing portion directly supporting the first shaft member for rotational movement within the first leg member and a second bushing portion directly supporting the second shaft member for rotational movement within the first leg member, wherein the bushing plate is attached to the first leg member via at least one mechanical fastener.

Yet another embodiment as shown and described herein may alternatively or further include a landing gear assembly configured to support a trailer where the landing gear assembly includes a leg assembly including a first leg member and a second leg member telescopingly received within the first leg member and adjustable between a retracted position and an extended position, a gear assembly operably coupled to the leg assembly and configured to move the first leg member between the retracted and extended positions, wherein the gear assembly includes a first shaft member and a first gear where the first shaft member and the first gear are a single, integral piece, a first bushing member including a bushing portion having a bushing portion and a closed end and rotatably supporting a first end of the first shaft member within the first leg member, and a second bushing member including a bushing portion having a bushing portion and a closed end and rotatably supporting a second end of the first shaft member within the first leg member.

Still yet another embodiment as shown and described herein may alternatively or further include a method of assembling a landing gear assembly configured to support a trailer where the landing gear assembly includes providing a leg assembly including a first leg member and a second leg member telescopingly received within the first leg member and adjustable between a retracted position and an extended position, the first leg member having an open end, a first aperture extending through a first sidewall and a second aperture extending through a second sidewall, providing a gear assembly that includes a first shaft member and a first gear where the first shaft member and the first gear are a single, integral piece, wherein the gear assembly is configured to move the second leg member between the retracted and extended positions, positioning the first shaft member and first gear within the first leg member by passing the first shaft member and first gear through the open end of the first leg member, extending a first end of the first shaft member through the first aperture and extending a second end of the first shaft member through the second aperture and providing a bushing member that includes a bushing portion having a closed end and a plate portion extending outwardly from the bushing portion. The method may further include attaching the first bushing member to the first wall of the first leg member such that the first bushing member rotatably supports the first end of the first shaft member, providing a second bushing member that includes a bushing portion having a closed end and a plate portion extending outwardly from the bushing portion, and attaching the second bushing member to the second wall of the first leg member such that the second bushing member rotatably supports the second end of the first shaft member.

Another embodiment as shown and described herein may alternatively or further include a landing gear assembly configured to support a trailer where the landing gear assembly includes a leg assembly including a first leg member and a second leg member telescopingly received within the first leg member and adjustable between a retracted position and an extended position, the first leg member having a first aperture extending through a first sidewall and a second aperture extending through a second sidewall, and a gear assembly including an input shaft extending through the first aperture and a drive gear fixed to the input gear, an output shaft extending through the second aperture and a output gear fixed to the output shaft, where the output gear includes a slot and the input shaft and the output shaft are configured to telescopingly engage one another, a first locking pin extending through the output shaft and received within the slot of the output gear thereby fixing the output gear to the output shaft, and a second locking pin extending though the output shaft at a position outside of the first leg member where the first and second locking pins cooperate to prevent removal of the output shaft from the second aperture.

Still yet another embodiment as shown and described herein may alternatively or further include a method of assembling a landing gear assembly configured to support a trailer where the landing gear assembly includes providing a leg assembly including a first leg member and a second leg member telescopingly received within the first leg member and adjustable between a retracted position and an extended position, the first leg member having a first aperture extending through a first sidewall and a second aperture extending through a second sidewall, providing a gear assembly including an input shaft and a drive gear fixed for rotation with the input gear, an output shaft, an output gear having a slot, a first locking pin, and a second locking pin, providing a first bushing member, and providing a second bushing member. The method may further include attaching the second bushing member to the second sidewall, positioning the output gear within an interior of the first leg member, extending the output gear through the second bushing member, the second aperture and the output gear, inserting the first locking pin into a first aperture in the output shaft, engaging the first locking pin with the slot of the output shaft thereby fixing the output gear with the output shaft, inserting the second locking pin into a second aperture of the output shaft thereby preventing the output shaft from being removed from within the second bushing member, extending the input shaft through the first bushing member, extending the input shaft and the first bushing member through the first aperture such that the input and output shafts engage one another, and attaching the first bushing member to the first wall.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
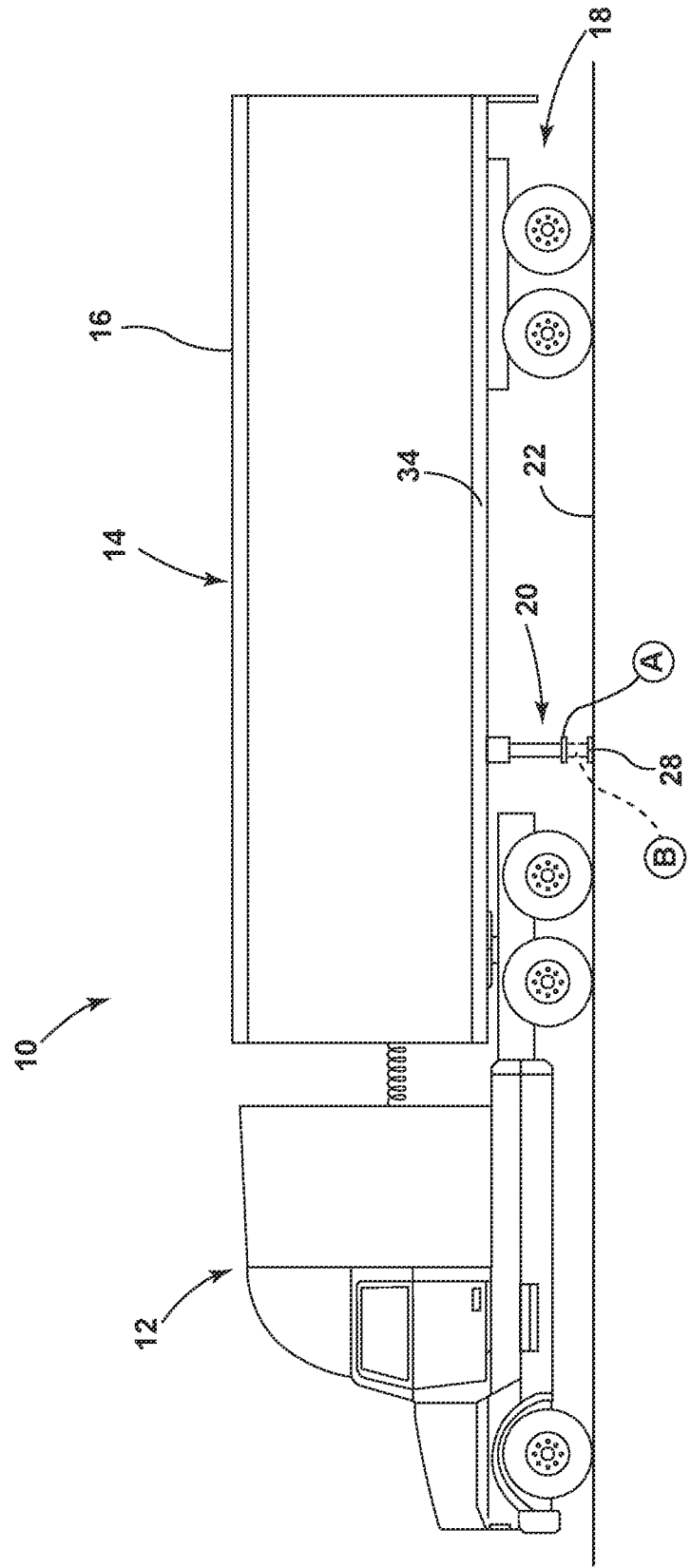
FIG. 1 is a side elevation view of a vehicle combination.
Figure 2:
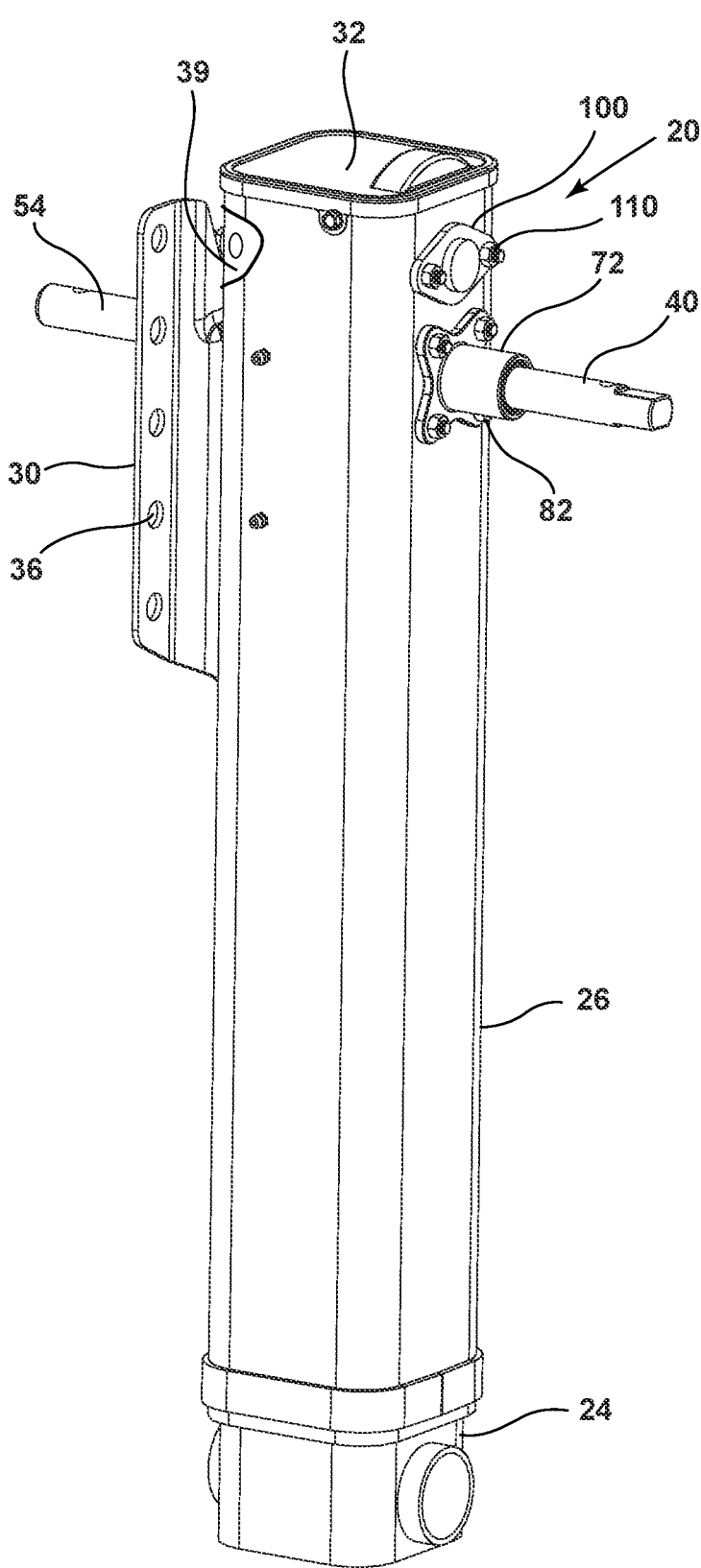
FIG. 2 is a perspective view of a landing gear assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

A vehicle combination 10 (FIG. 1) includes a towing vehicle shown as a tractor or semi-truck 12 and a towed vehicle shown as a heavy-duty commercial trailer or semi-trailer 14. In the illustrated example, the semi-trailer 14 includes a trailer body 16 supported at one end by a suspension assembly 18, and at an opposite end by the truck 12. The trailer 14 further includes landing gear assemblies or landing leg assemblies 20 movable between a raised position A where the landing gear assembly 20 is spaced from a supporting ground surface 22, and a lowered or extended position B where the landing leg assembly 20 abuts the ground surface 22 and supports the forward end of the trailer 14, thereby allowing the truck 12 to be uncoupled from and removed from beneath the trailer 14. Although only a single landing gear assembly 20 is illustrated in FIG. 1, it is noted that the trailer 14 is supported by two separate landing leg assemblies 20 located on opposite sides of the trailer 20 from one another.

The landing leg assembly 20 (FIG. 2) includes a lower leg member or housing 24 telescopingly received within an upper leg member or housing 26, a foot member 28 (FIG. 1) affixed to a distal end of the lower leg member 24, wherein the foot member 28 is configured to abut the ground surface 22 when the landing leg assembly 20 is in the extended position B, and a mounting plate 30 fixedly secured to an outer surface of the upper leg member 26 and configured to secure the landing leg assembly 20 to a frame member 34 of the trailer 14 via a plurality of mechanical fasteners (not shown) that are received within apertures 36 of the mounting plate 30. The lower leg member 24, the upper leg member 26 and the mounting plate 30 each comprise a metal. A cover cooperates with the upper leg member 26 to define an interior space 39.

Figure 3:
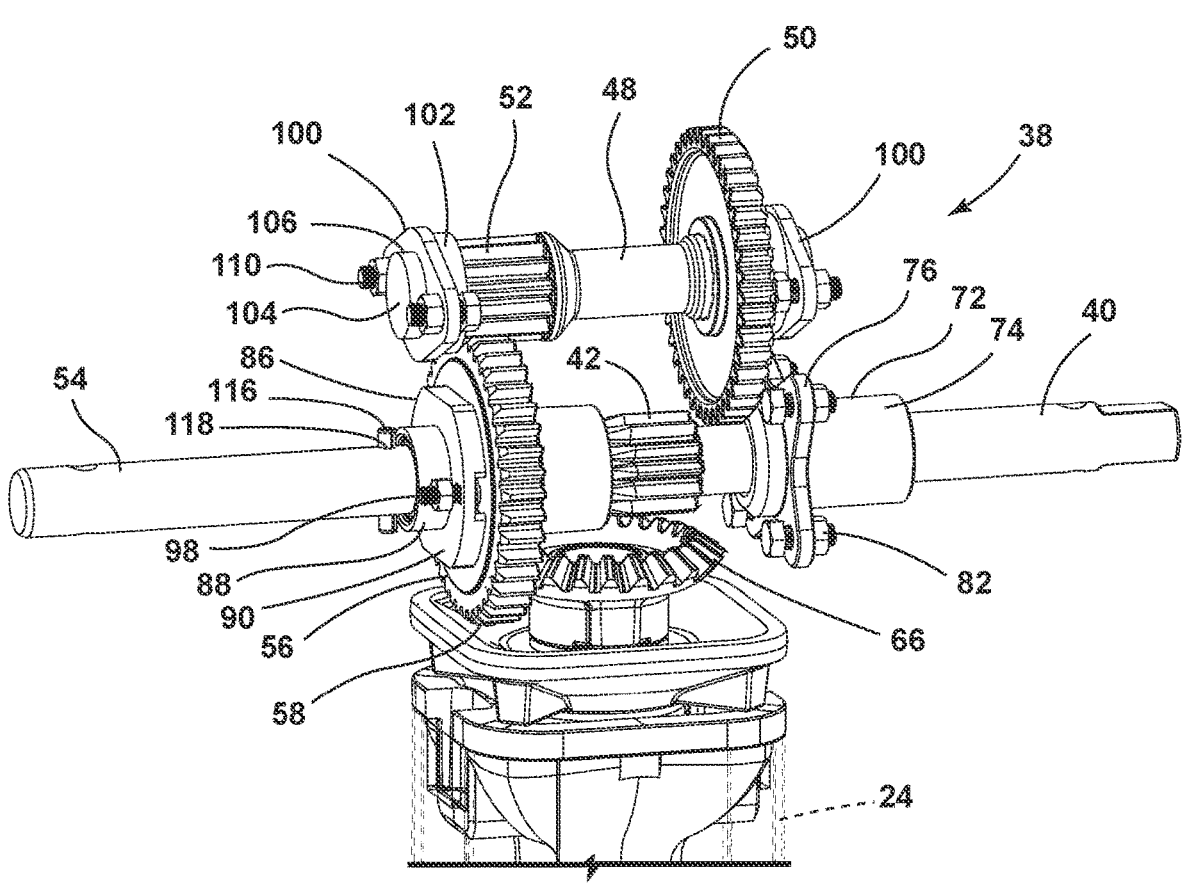
FIG. 3 is a first perspective view of a first embodiment of a gear assembly.
Figure 4:
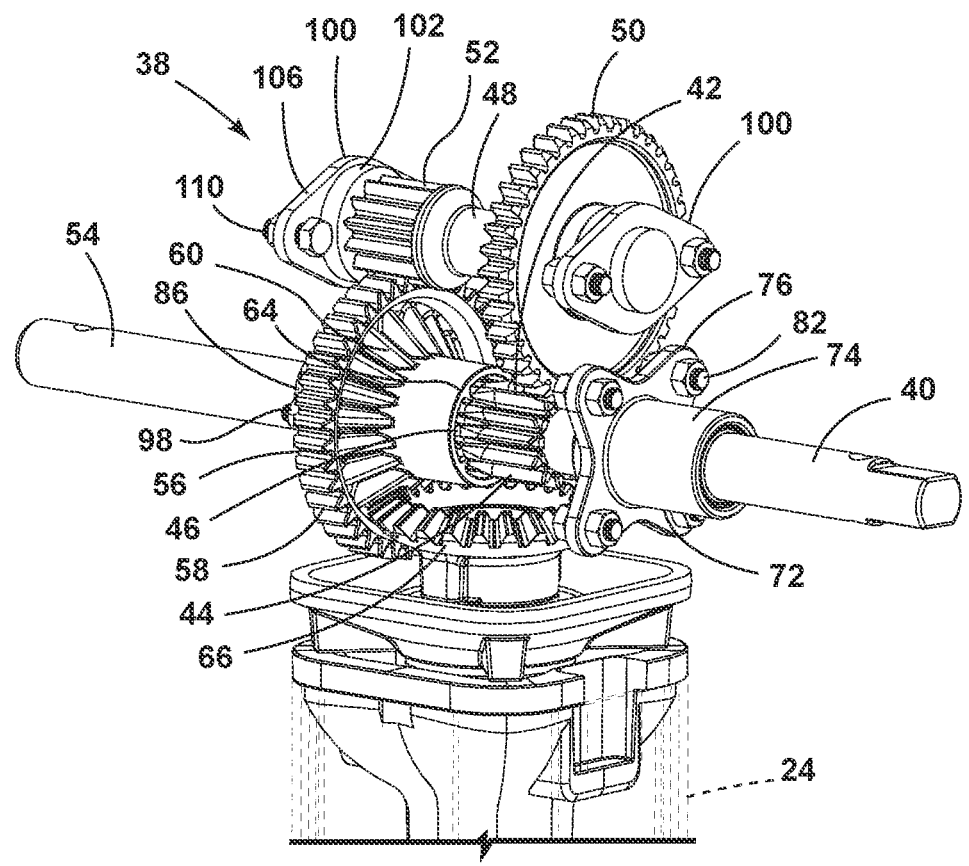
FIG. 4 is a second perspective view of the first embodiment of the gear assembly.
Figure 5:
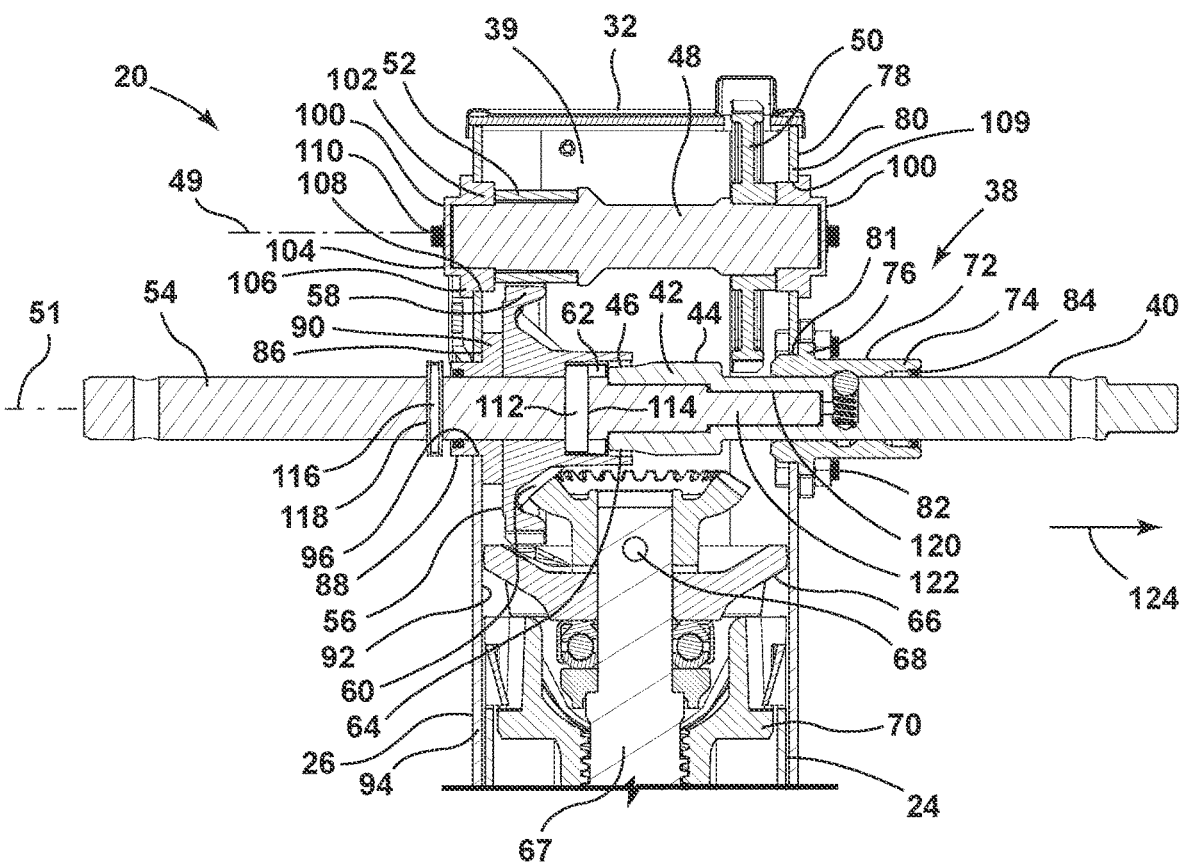
FIG. 5 is a cross-sectional side elevation view of the first embodiment of the gear assembly.

The landing leg assembly 20 further includes a gear assembly 38 (FIGS. 3-5) configured to receive an input from an operator to drive the landing leg assembly 20 between the retracted and extended positions A, B. In the illustrated example, a manual input from an operator via a handle or crank assembly (not shown) or a powered mechanical input from an electric or hydraulic motor and the like may be utilized. The gear assembly 38 may include an input shaft 40 configured to receive the manual or powered mechanical input, and a spur input gear 42 having a first portion 44 and a second portion 46 where the second portion 46 has a diameter that is less than the diameter of the first portion 44. The gear assembly 38 further includes an idler shaft 48 having a longitudinally extending axis 49 that is offset from a longitudinally extending axis 51 of the input shaft 40, a spur first idler gear 50 fixed to the idler shaft 48 and configured to be selectively engaged by the spur input gear 42 as described below, and a spur second idler gear 52 that is integral with the idler shaft 48. The gear assembly 38 further includes an output shaft 54 configured to couple the landing leg assembly 20 located on a first side of the semi-trailer 14 with an opposite landing leg assembly (not shown) located on an opposite side of the semi-trailer 14 in a manner as known in the art. The gear assembly 38 further includes an output gear member 56 having a first spur gear portion 58 engaged by the spur second idler gear 52, and a beveled gear portion 60 as further described below, a locking-pin receiving slot 62, and a second spur gear portion 64 configured to selectively receive the spur input gear 42 therein, as described below. The beveled gear portion 60 of the output gear member 56 engages and drives an output beveled gear 66 fixed to an end of a jack shaft or drive shaft 67 via a pin 68. A drive nut 70 is threadably received on the threaded jack shaft 67 and is secured to an interior of the lower leg member 24 such that movement of the drive nut 70 along the length of the jack shaft 67 telescopingly moves the lower leg member 24 with respect to the upper leg member 26 between the retracted and extended positions A, B.

The input shaft 40 is rotationally supported from the upper leg member 26 by a bushing arrangement 72 that includes a bushing portion 74 and a lip or plate portion 76 that extends outwardly from the bushing portion 74, where the plate portion 76 is secured to an outer surface 78 of a sidewall 80 of the upper leg member 26 via a plurality of mechanical fasteners such as bolts 82. In the illustrated example, the bushing portion 74 and the plate portion 76 of the bushing arrangement 72 form a single, integral piece, where the bushing arrangement 72 comprises a sintered metal, such as iron nickel, and directly supports the input shaft 40 without the use of a separate bushing sleeve. An O-ring type seal member 84 is positioned between the bushing portion 74 of the bushing arrangement 72 and the input shaft 40. In assembly, as further described below, the bushing portion 74 of the bushing arrangement 72 and the input shaft 40 extend through an aperture 81 extending through the sidewall 80.

A bushing arrangement 86 supports the output shaft 54 for rotation within the upper leg member 26 and includes a bushing portion 88 and a plate portion 90, where the plate portion 90 is secured to an inner surface 92 of a sidewall 94 of the upper leg member 26. In assembly, as further described below, the bushing portion 88 of the bushing arrangement 86 and the output shaft 54 extend through an aperture 96 that extends through the sidewall 94, where the plate portion 90 of the bushing arrangement 86 is secured to the inner surface 92 of the sidewall 94 by a plurality of mechanical fasteners such as bolts 98. The bushing member portion 88 and the plate portion 90 form a single, integral piece, where the bushing arrangement comprises a sintered metal, such as iron nickel, and directly supports the output shaft 54 without use of a separate bushing sleeve.

The idler shaft 48 is supported by a pair of bushing arrangements 100 located at and supporting opposite ends of the idler shaft 48. In the illustrated example, each bushing arrangement 100 includes a bushing portion 102 having a closed end 104, and a plate portion or flange 106, where the bushing portion 102 and the plate portion 106 form a single, integral piece. In the illustrated example, the bushing portion 102 of each bushing arrangement 100 and the associated end of the idler shaft 48 extend through a respective aperture 108, 109 extending through the associated sidewalls 80, 94 of the upper leg member 26. The plate portion 106 of each bushing arrangement 100 is secured to an outer surface of the upper leg member 26 by a plurality of mechanical fasteners such as bolts 110, although other suitable fasteners may also be utilized including, but not limited to, rivets, screws, anchors, and the like. In the illustrated example, the bushing portion 102 of each of the bushing arrangements 100 comprises a sintered metal and directly supports the associated end of the idler shaft 48 without the use of a separate bushing sleeve.

In assembly, the bushing arrangement 86 is secured to the inner surface 92 of the sidewall 94 of the upper leg member 26 by the plurality of bolts 98. The output gear member 56 is then inserted into the interior 39 of the upper leg member 26 via an open end of the upper leg member 26 when the cover 32 is removed therefrom. The output gear member 56 is located proximate the bushing arrangement 86 and the output shaft 54 is extended through the bushing arrangement 86, the aperture 96 and the output gear member 56. A locking pin 112 is then press-fit into a locking pin aperture 114 of the output shaft 54, and the output shaft 54 withdrawn until the locking pin 112 is received within the locking pin receiving slot 62 of the output gear member 56 thereby rotationally locking the output gear member 56 with the output shaft 54. A locking pin 116 is then press-fit into a locking pin aperture 118 of the output shaft 54 that is located on an exterior of the upper leg member 26 such that the locking pins 112, 116 prevent the removal of the output shaft 54. The input shaft 40 is then inserted into the bushing arrangement 72, and the bushing portion 74 of the bushing arrangement 72 and the input shaft 40 inserted through the aperture 81, and the bushing arrangement 72 is secured to the sidewall 80 via bolts 82. In the illustrated example, an end bore 120 of the input shaft 40 rotationally receives an engagement portion 122 of the output shaft 54.

In operation, the landing leg assembly 20 is operable between a high gear, low torque configuration where the second portion 46 of the spur input gear 42 engages the second spur gear portion 64 of the output gear member 56 and the second portion 46 of the spur input gear 42 does not engage the first idler gear 50, and a low gear, high torque configuration where the input shaft 40 is moved in a linear direction 124 until the first portion 44 of the spur input gear 42 engages the first idler gear 50 and the second portion 46 of the spur input gear 42 is withdrawn from and does not engage the second spur gear portion 64 of the output gear member 56.

Figure 6:
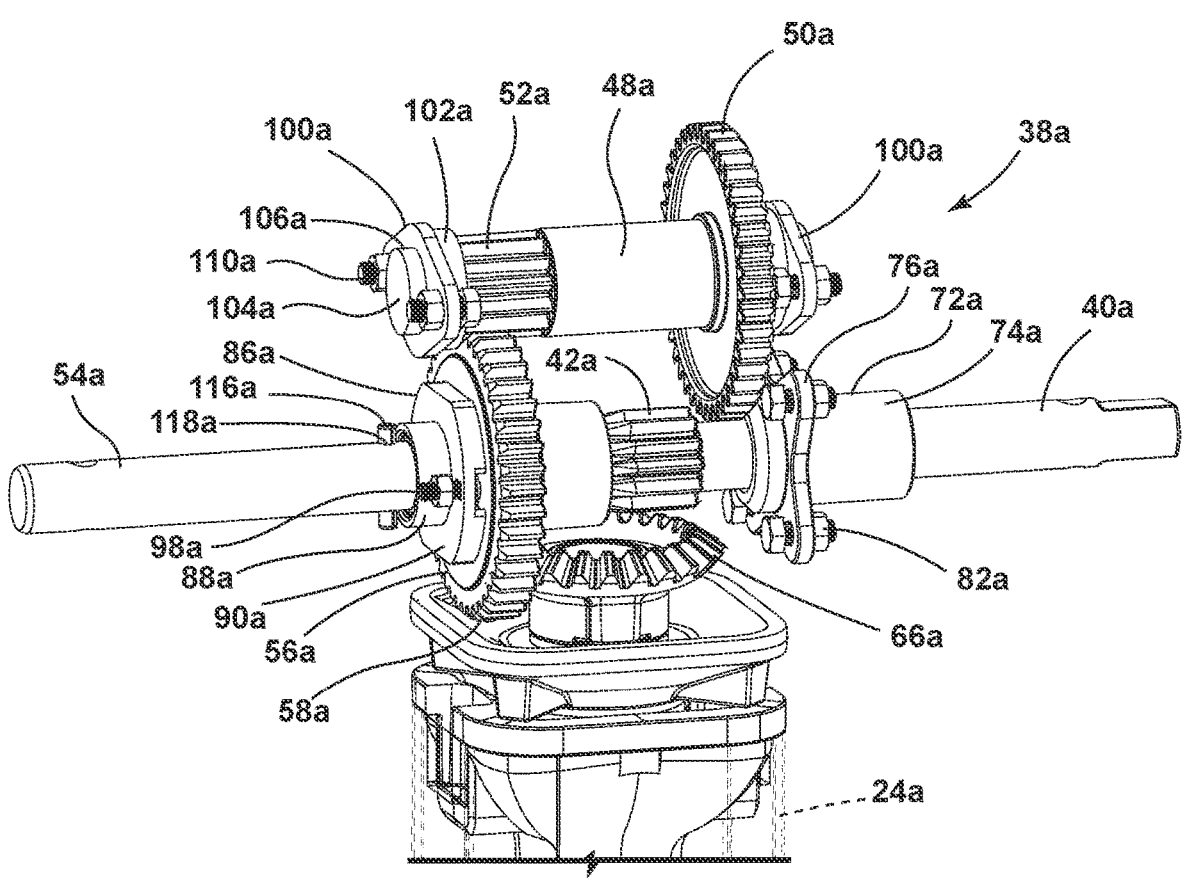
FIG. 6 is a first perspective view of a second embodiment of the gear assembly.
Figure 7:
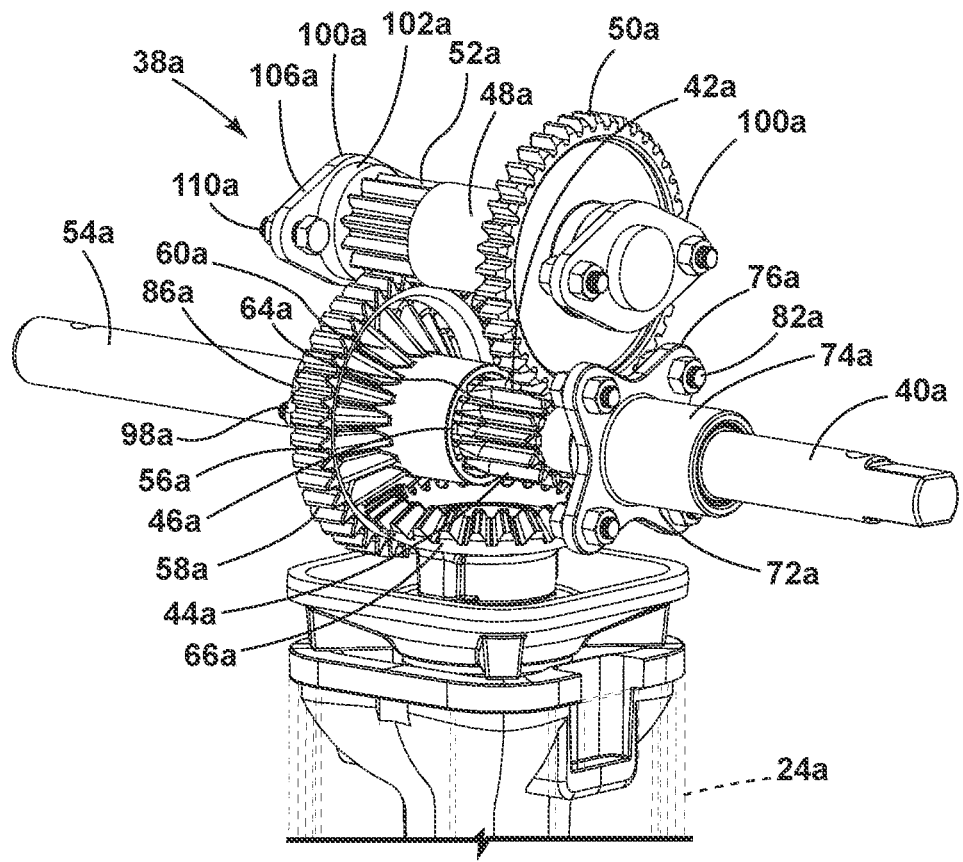
FIG. 7 is a second perspective view of the second embodiment of the gear assembly.
Figure 8:
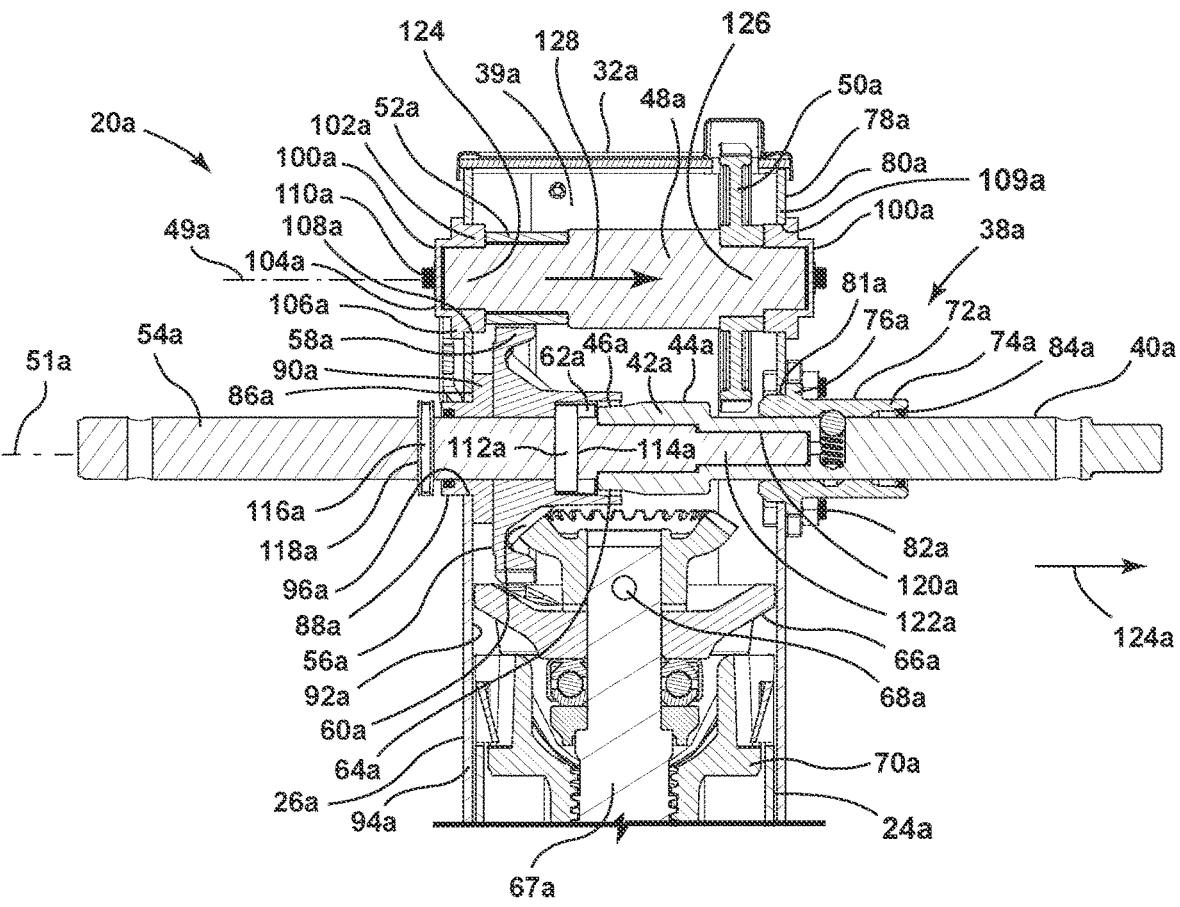
FIG. 8 is a cross-sectional side elevation view of the second embodiment of the gear assembly.

The reference numeral 38a (FIGS. 6-8) generally designates another embodiment of the gear assembly. Since the gear assembly 38a is similar to the previously described gear assembly 38, similar parts appearing in FIGS. 3-5 and FIGS. 6-8 respectively are represented by the same, corresponding reference numerals, except for the suffix "a" in the numerals of the latter. The gear arrangement 38a is similar to the previously described gear arrangement 38 with the most notable exception being the configuration of the idler shaft and idler gears. In the illustrated example, the gear assembly

38a includes an idler shaft 48a, a first idler gear 50a and a second idler gear 52a that are integrally formed in a single piece with one another. In assembly, the idler shaft 48a is moved into the interior space 39a of the upper leg member 26a via the open end thereof, and a first end 124 of the idler shaft 48a is extended through the aperture 108a of the upper leg member 26a. The opposite second end 126 of the idler shaft 48a is then lowered into position and the idler shaft 48a moved in a direction 128 until the second end of the idler shaft 48a extends through the opposite aperture 109d. The bushings 100a are then secured in place in a similar manner to the bushings 100 as described above.

Figure 9:
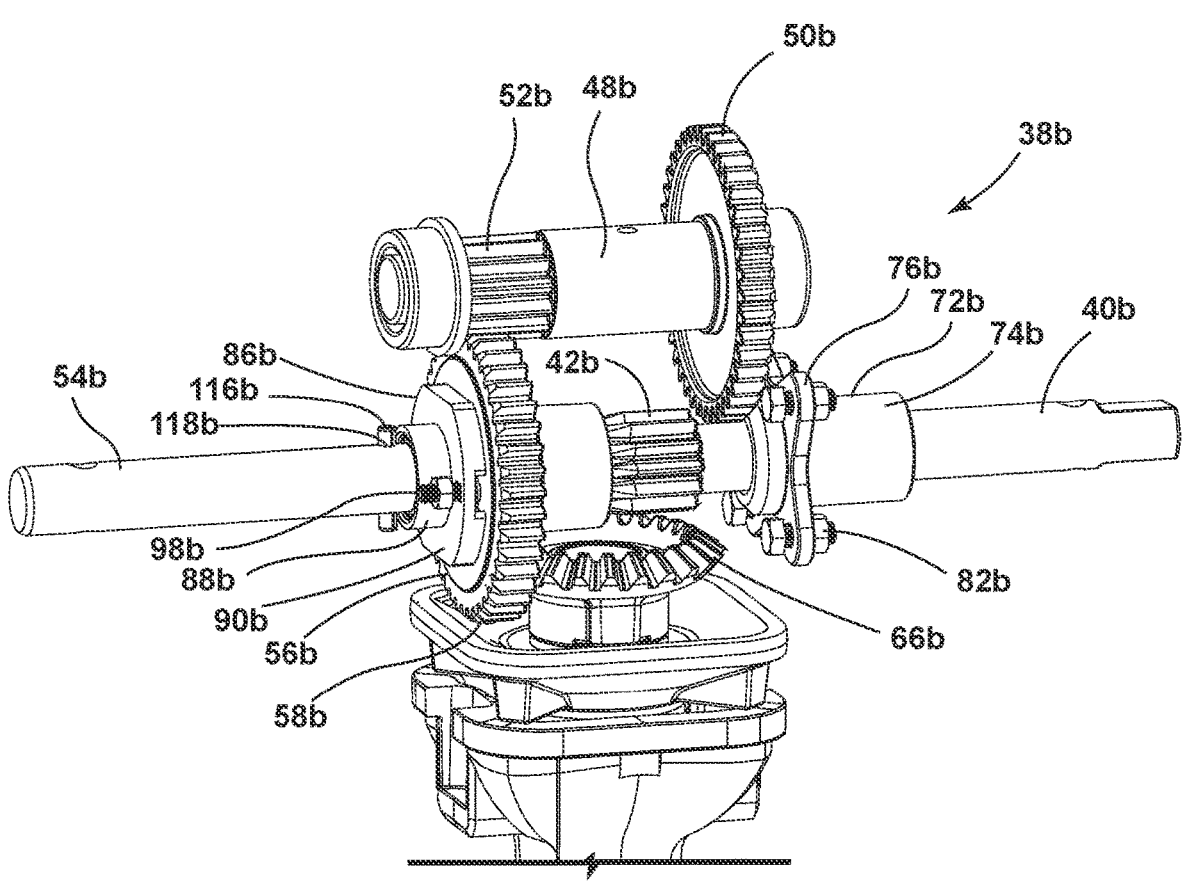
FIG. 9 is a first perspective view of a third embodiment of the gear assembly.
Figure 10:
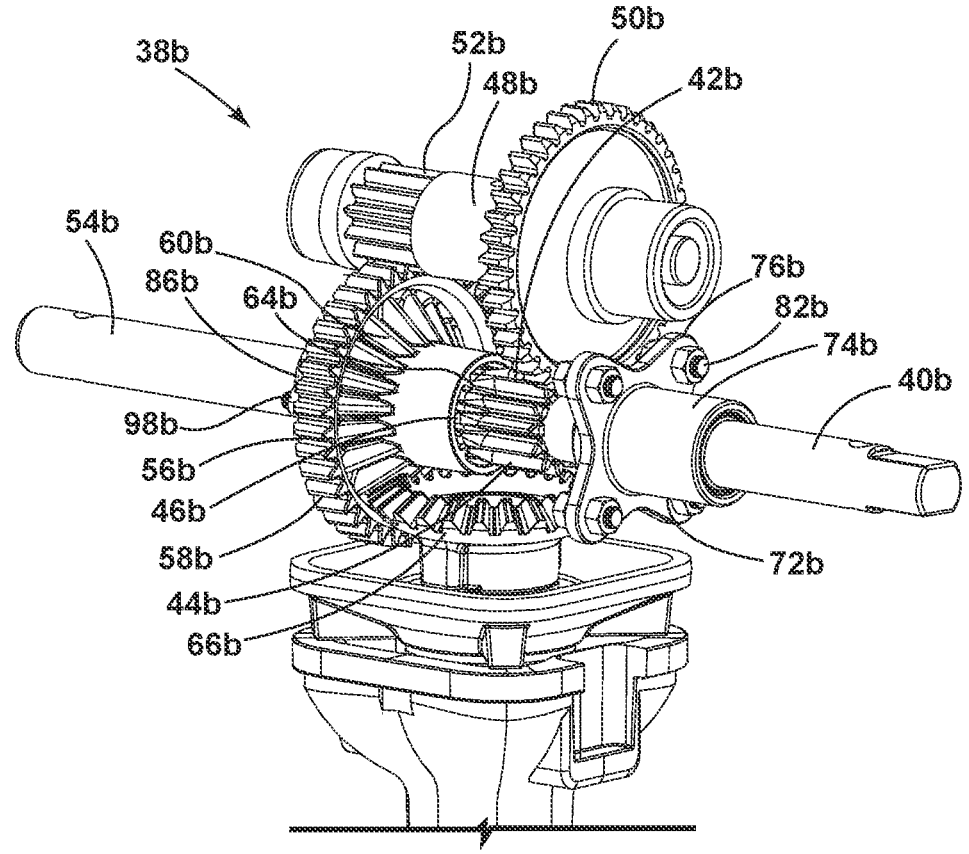
FIG. 10 is a second perspective view of the third embodiment of the gear assembly.
Figure 11:
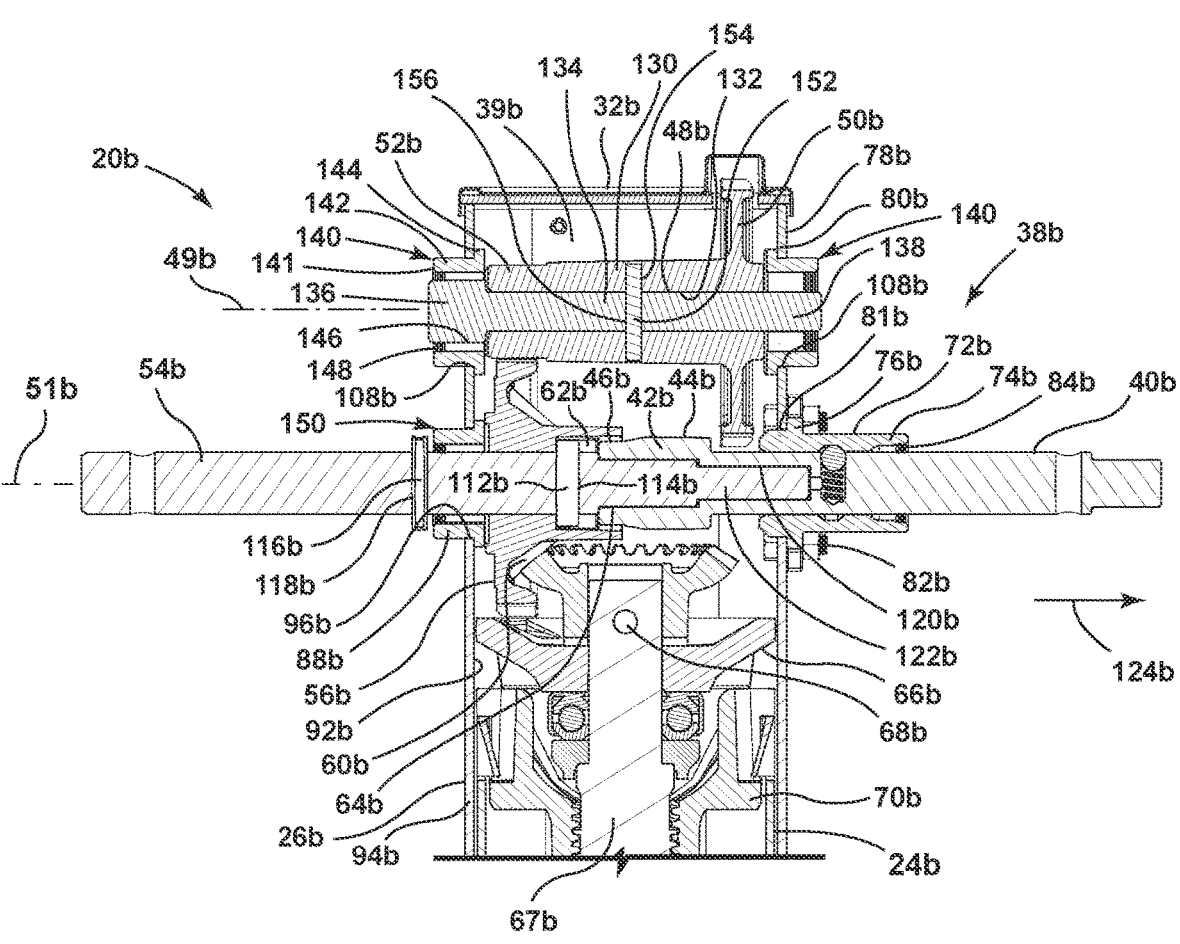
FIG. 11 is a cross-sectional side elevation view of the third embodiment of the gear assembly.

The reference numeral 38b (FIGS. 9-11) generally designates another embodiment of the gear assembly. Since the gear assembly 38b is similar to the previously described gear assembly for 38a, similar parts appearing in FIGS. 6-8 and FIGS. 9-11 respectively are represented by the same, corresponding reference numeral, except for the suffix "b" in the numerals of the latter. The gear assembly 38b is similar to the gear assembly 38a with the most notable exceptions being the configuration of the idler shaft and bearing members. In the illustrated example, the idler shaft 48b includes a first outer tube portion 130 that is integrally formed with the first idler gear 50b and the second idler gear 52b and includes an inner passage 132, and an inner shaft portion 134 that is received within the inner passage 132 of the outer tube portion 130 and includes first and second ends 136, 138 that extend outwardly from associated ends of the outer tube portion 130. Each end 136, 138 is supported by an associated bearing arrangement 140. Each bearing arrangement 140 includes a bearing housing 141 that includes a body portion 142 and a lip portion 144 extending outwardly therefrom, and a bearing sleeve 146 received within the body portion 142 of the bearing housing 141. An O-ring type seal 148 is positioned between the associated end 136, 138 of the inner shaft 134 and the bearing housing 141 of the associated bearing arrangement 140. It is noted that in the illustrated example, the output shaft 54b is rotationally supported within the upper leg member 26b by a bearing arrangement 150 that is similar in construction to the bearing arrangements 140.

In assembly, the bearing arrangements 140 are secured to the upper leg member 26b by a weld extending about the body portion 142 of each bearing arrangement 140, thereby attaching the bearing arrangements 140 to the upper leg member 26b. The outer tube portion 130 is then positioned within the interior 39b of the upper leg member 26 by passing the outer tube portion 130 through an open end of the upper leg member 26b, and the inner passage 132 is aligned with the apertures 108b of the upper leg member 26b. The inner shaft 134 is then extended into the inner passage 132 of the outer tube portion 130. A locking pin 152 is then press-fit into an aperture 154 of the outer tube portion 130 and an aperture 156 of the inner shaft 134, thereby connecting the inner shaft 134 with the outer tube portion 130.

Figure 12:
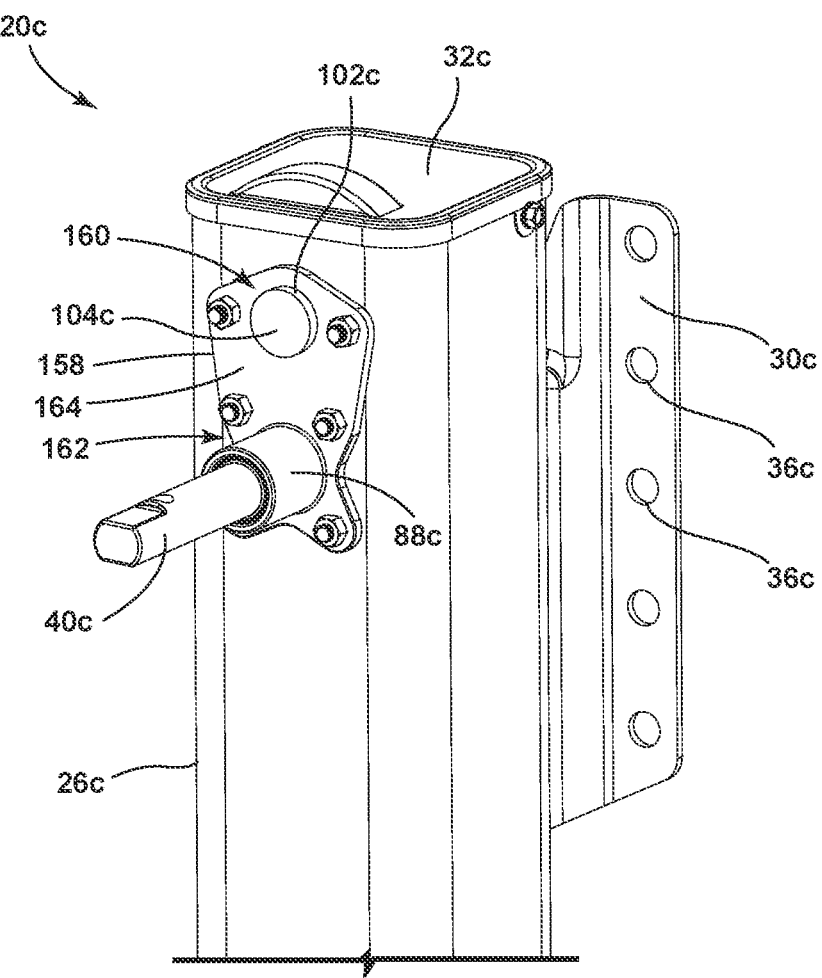
FIG. 12 is a perspective view of a fourth embodiment of the landing gear assembly.

The reference numeral 20c (FIG. 12) generally designates another embodiment of the landing gear assembly. Since the landing gear assembly 20c is similar to the landing gear assembly 20, similar parts appearing in FIGS. 1-5 and FIG. 12 respectively are represented by the same, corresponding reference numeral, except for the suffix "c" in the numerals of the latter. The landing gear assembly 20c is similar to the previously described landing gear assembly 20, with the most notable exception being the replacement of the bushing arrangement 72 and the bushing arrangement 100 of the landing gear assembly 20 with a combined bushing arrangement 158. In the illustrated example, the combined bushing arrangement 158 includes an upper bushing arrangement 160 that is similar in configuration as the previously described bushing arrangement 100 and a lower bushing arrangement 162 that is similar in configuration as the previously described bushing arrangement 72. In the illustrated example, the upper bushing arrangement 160 and the lower bushing arrangement 162 are coupled via a bushing or mounting plate 164 that extends outwardly from the bushing portion 102*c* and the bushing portion 88*c* of the lower bushing arrangement 162 such that the bushing portion 102*c*, the bushing portion 88*c* and the bushing plate 164 are integrally formed with one another.

Figure 13:
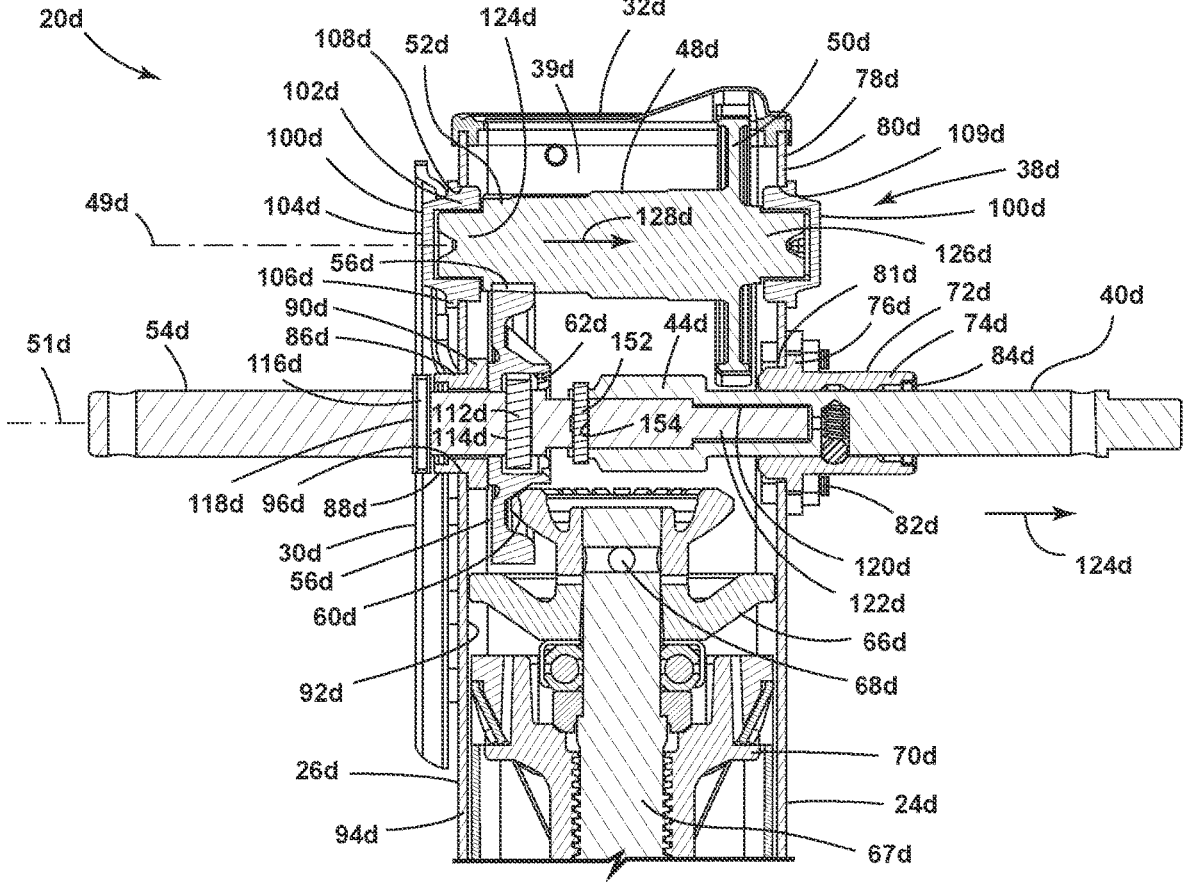
FIG. 13 is a cross-sectional side elevation view of a fifth embodiment of the gear assembly.
Figure 14:
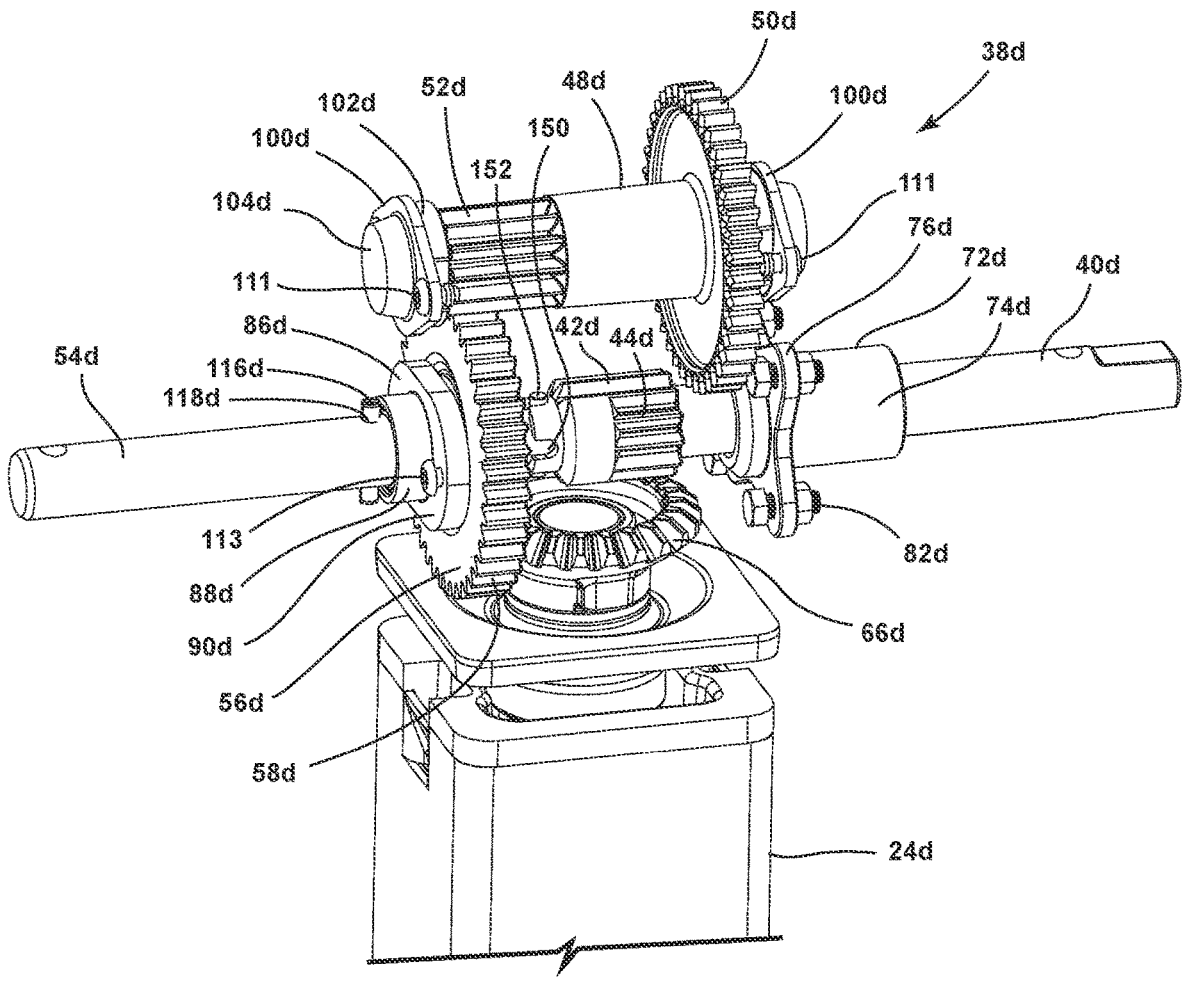
FIG. 14 is a first perspective view of the fifth embodiment of the gear assembly.
Figure 15:
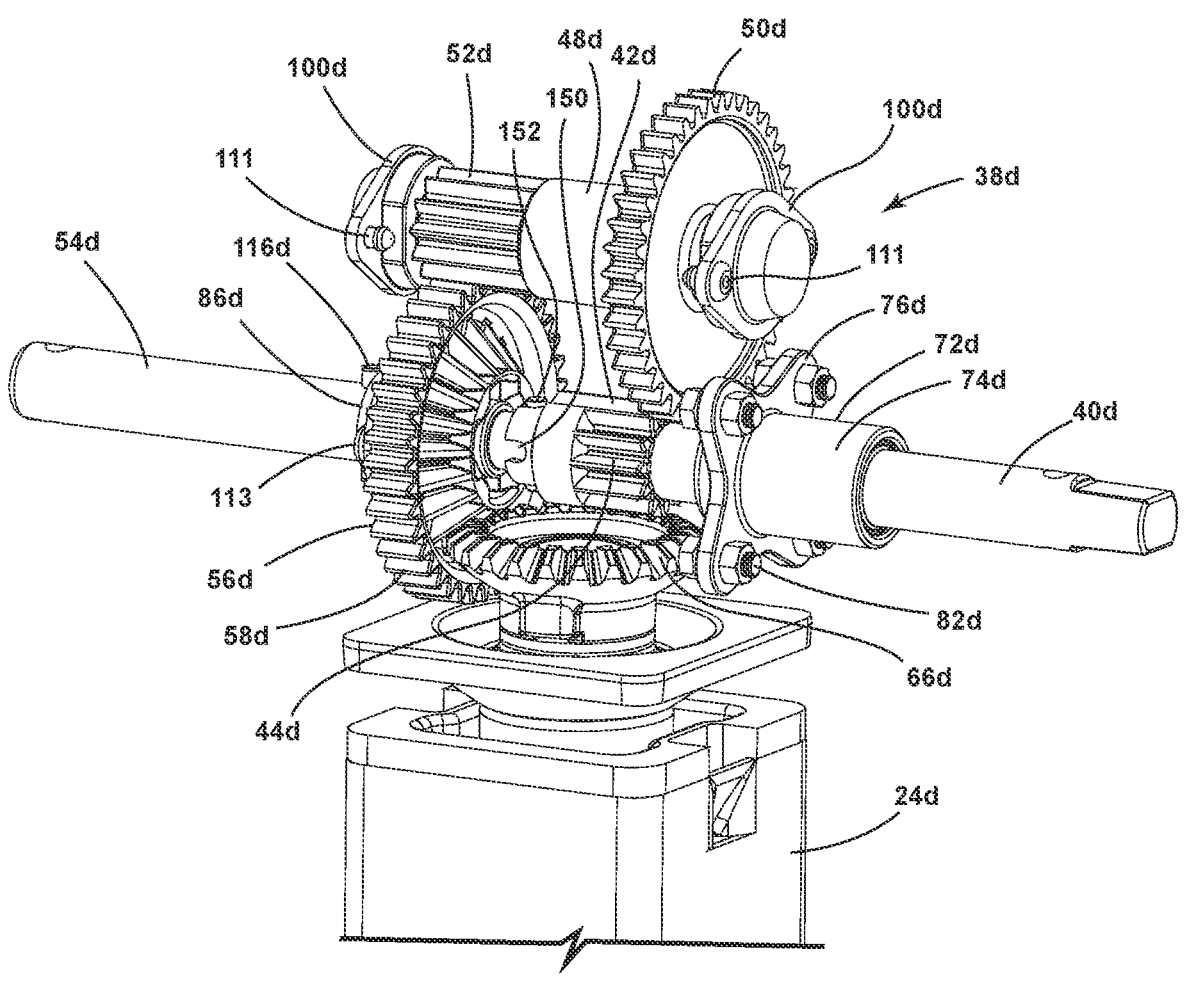
FIG. 15 is a second perspective view of the fifth embodiment of the gear assembly.
Figure 16A:
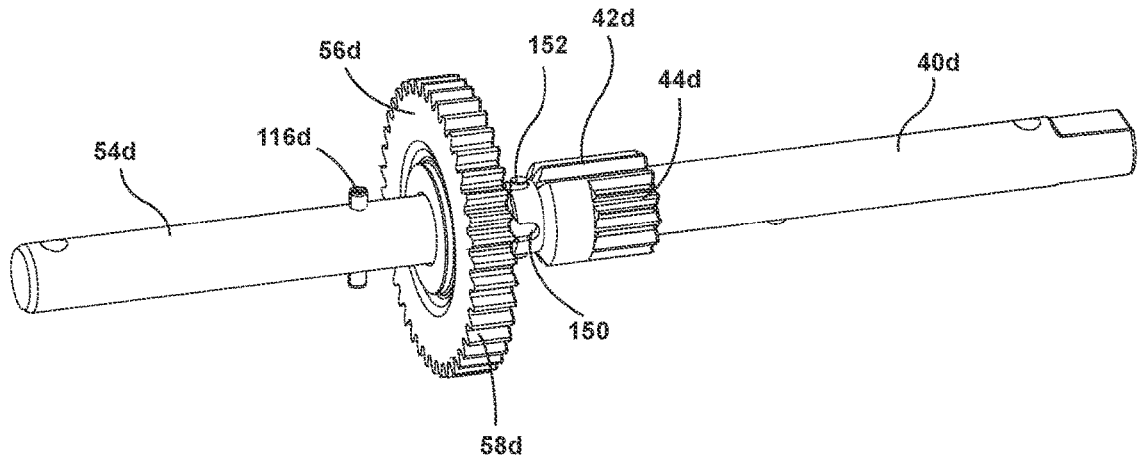
FIG. 16A is a perspective view of an input and output assembly of the fifth embodiment of the gear assembly.
Figure 16B:
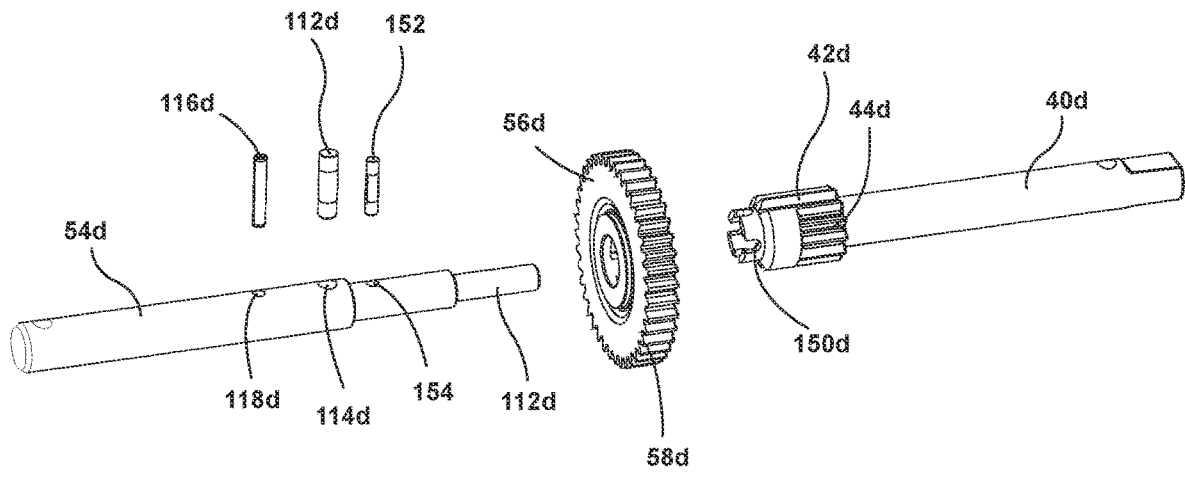
FIG. 16B is an exploded view of the input and output shaft assembly of FIG. 16A.

The reference numeral 38*d* (FIGS. 13-15) generally designates another embodiment of the gear assembly. Since the gear assembly 38*d* is similar to the previously described gear assembly 38, similar parts appearing in FIGS. 13-15 and FIGS. 2-5 respectively are represented by the same, corresponding reference numerals, except for the suffix "d" in the numerals of the latter. In the illustrated example, the gear assembly 38*d* includes an idler shaft 48*d*, a first idler gear 50*d* and a second idler gear 52*d* that are integrally formed in a single piece with one another. In assembly, the idler shaft 48*d* is moved into the interior space 39*d* of the upper leg member 26*d* via the open end thereof, and a first end 124*d* of the idler shaft 48*d* is extended through the aperture 108*d* of the upper leg member 26*d*. The opposite second end 126*d* of the idler shaft 48*d* is then lowered into position and the idler shaft 48*d* moved in a direction 128*d* until the second end 126*d* of the idler shaft 48*d* extends through the opposite aperture 109*d*. The bushings 100*d* are then secured in place in a similar manner to the bushings 100 as described above. It is noted that in the illustrated example, the bushings 100*d* are secured via rivets 111.

As further shown in FIGS. 13-16B and in assembly, the bushing arrangement 86*d* is secured to the inner surface 92*d* of the sidewall 94*d* of the upper leg member 26*d* by the plurality of rivets 113. The output gear member 56*d* is then inserted into the interior 39*d* of the upper leg member 26*d* via an open end of the upper leg member 26*d* when the cover 32*d* is removed therefrom. The output gear member 56*d* is located proximate the bushing arrangement 86*d* and the output shaft 54*d* is extended through the bushing arrangement 86*d*, the aperture 96*d* and the output gear member 56*d*. A locking pin 112*d* is then press-fit into a locking pin aperture 114*d* of the output shaft 54*d*, and the output shaft 54*d* withdrawn until the locking pin 112*d* is received within a locking pin receiving slot 62*d* of the output gear member 56*d* thereby rotationally locking the output gear member 56*d* with the output shaft 54*d*. A locking pin 116*d* is then press-fit into a locking pin aperture 118*d* of the output shaft 54*d* that is located on an exterior of the upper leg member 26*d* such that the locking pins 112*d*, 116*d* prevent the removal of the output shaft 54*d*. The input shaft 40*d* is then inserted into the bushing arrangement 72*d*, and the bushing portion 74*d* of the bushing arrangement 72*d* and the input shaft 40*d* inserted through the aperture 81*d*. The bushing arrangement 72*d* is then secured to the sidewall 80*d* via bolts 82*d*. In the illustrated example, an end bore 120*d* of the input shaft 40*d* rotationally receives an engagement portion 122*d* of the output shaft 54*d*.

In operation, the landing leg assembly 20*d* is operable between a high gear, low torque configuration where a plurality of reliefs 150 opening from an end of the input shaft 40*d* selectively engage an engagement pin 152 received in and extending through an engagement pin aperture 154 of the output shaft 54*d*, and a second portion 44*d* of the spur input gear 42*d* does not engage the first idler gear 50*d*, and a low gear, high torque configuration where the input shaft 40*d* is moved in a linear direction 124*d* until the first portion 44*d* of the spur input gear 42*d* engages the first idler gear 50*d* and the input shaft 40*d* is withdrawn from engagement with the engagement pin 152.

Figure 17:
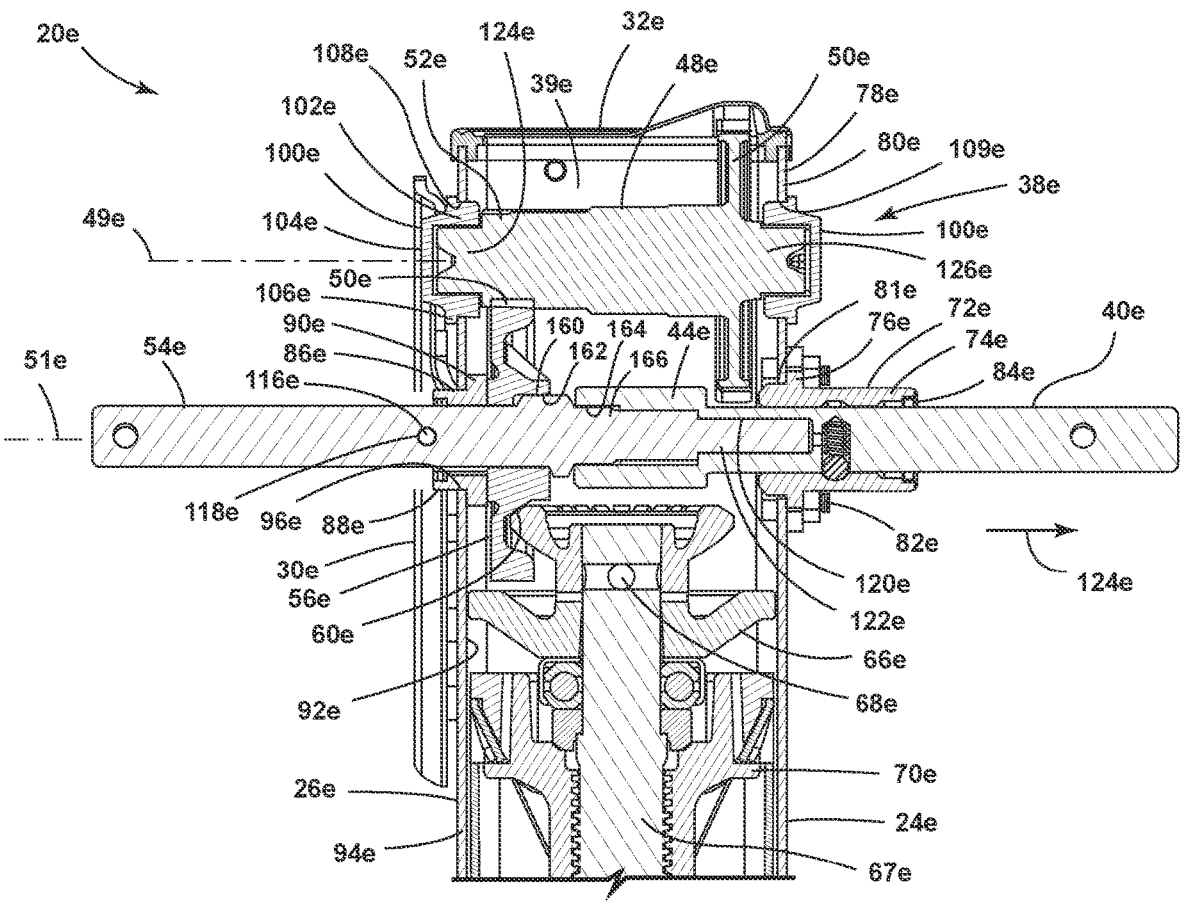
FIG. 17 is a cross-sectional view of a sixth embodiment of the gear assembly.
Figure 18:
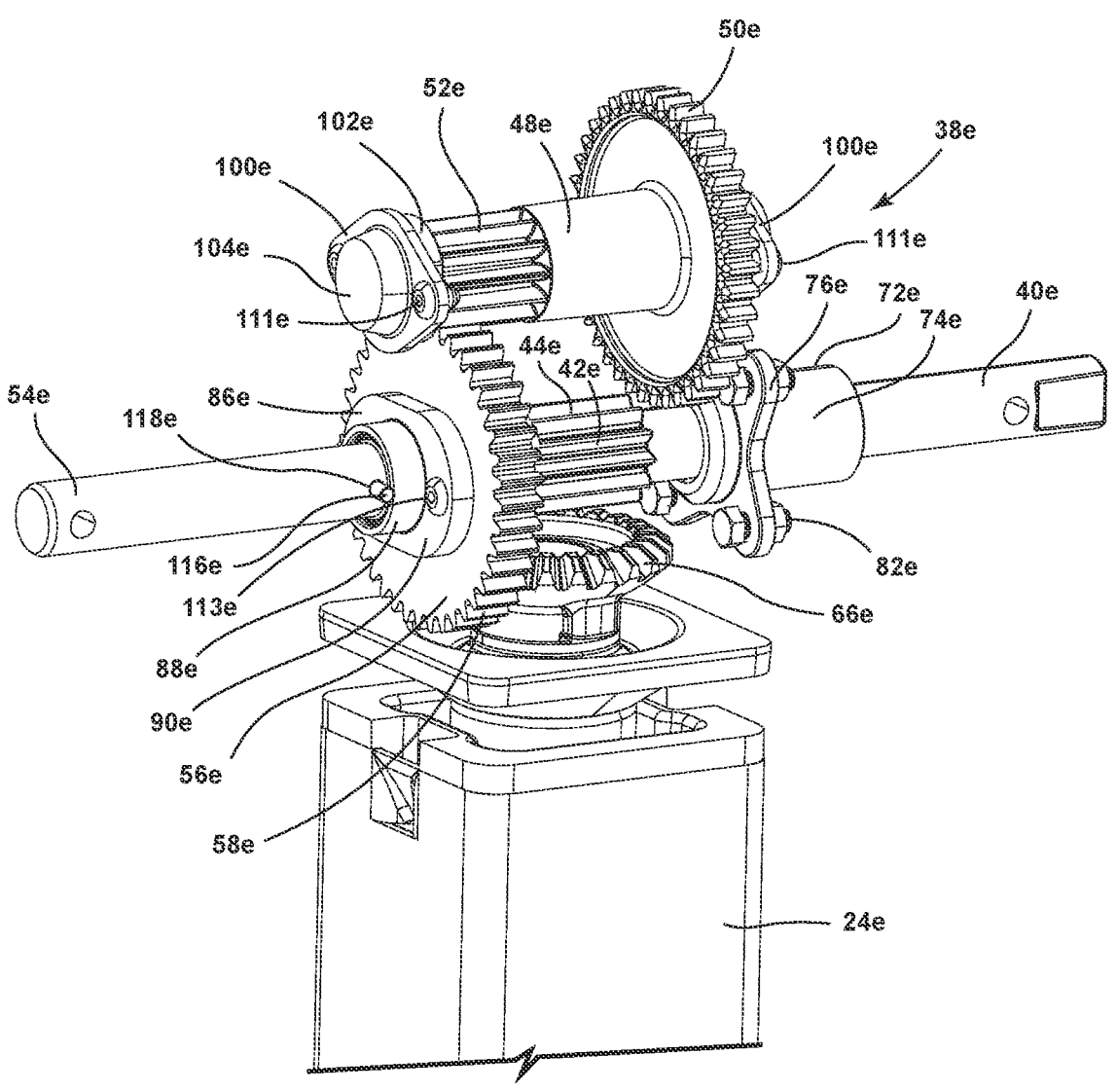
FIG. 18 is a first perspective view of the sixth embodiment of the gear assembly.
Figure 19:
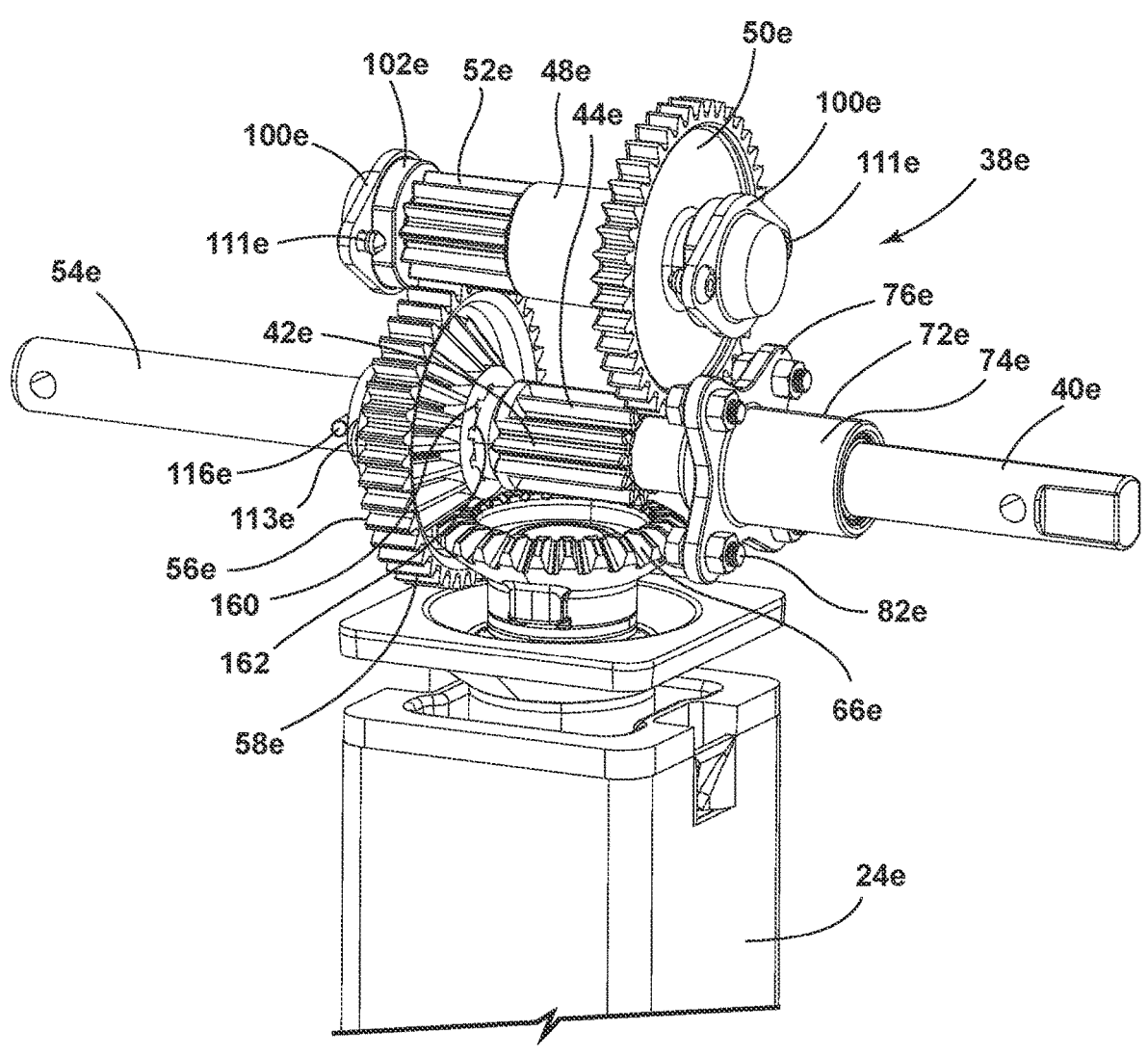
FIG. 19 is a second perspective view of the sixth embodiment of the gear assembly.
Figure 20A:
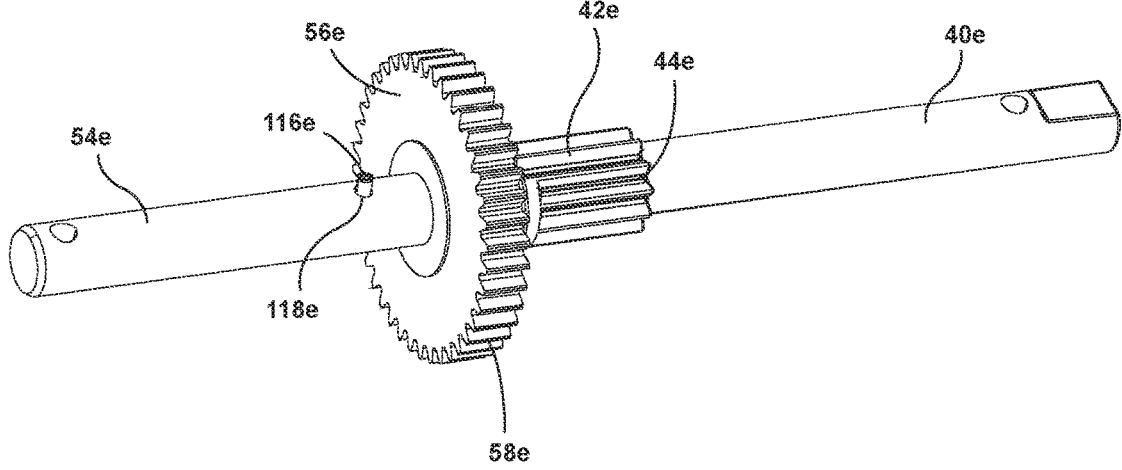
FIG. 20A is a perspective view of an input and output shaft assembly of the sixth embodiment of the gear assembly.
Figure 20B:
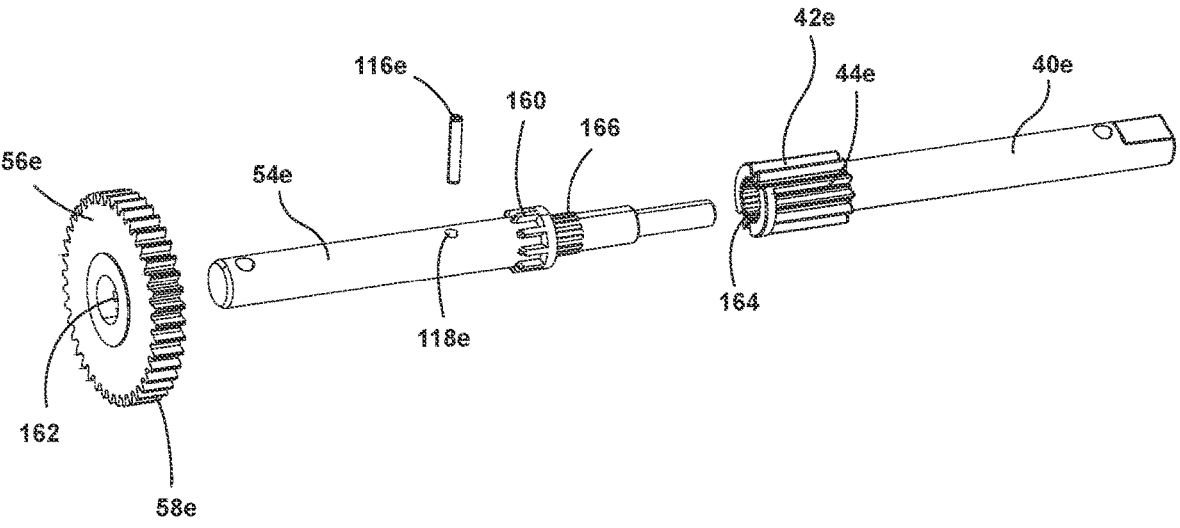
FIG. 20B is an exploded perspective view of the input and output shaft assembly of FIG. 20A.

The reference numeral 38*e* (FIGS. 17-19) generally designates another embodiment of the gear assembly. Since the gear assembly 38*e* is similar to the previously described gear assembly 38*d*, similar parts appearing in FIGS. 13-16*b* and FIGS. 17-19 respectively are represented by the same, corresponding reference numerals, except for the suffix "e" in the numerals of the latter. The gear arrangement 38*e* is similar to the previously described gear arrangement 38*d* with the most notable exception being the configuration of the input and output shafts.

The bushing arrangement 86*e* (FIGS. 17-20*b*) is secured to the inner surface 92*e* of the sidewall 94*e* of the upper leg member 26*e* by the plurality of bolts 98*e*. The output gear member 56*e* is then inserted into the interior 39*e* of the upper leg member 26*e* via an open end of the upper leg member 26*e* when the cover 32*e* is removed therefrom. The output gear member 56*e* is located proximate the bushing arrangement 86*e* and the output shaft 54*e* is slid through the aperture 81*e*, the output gear 56*e*, the aperture 86*e* and the output gear member 56*e* until first splines 160 integral with the output shaft 54*e* engage second splines 162 integral with the output gear member 56*e*, thereby rotationally locking the output gear 56*e* with the output shaft 54*e*. A locking pin 116*e* is then press-fit into a locking pin aperture 118*e* of the output shaft 54*e* that is located on an exterior of the upper leg member 26*e* such that the output gear member 56*e* and the locking pin 116*e* prevent the removal of the output shaft 54*e*. The input shaft 40*e* is then inserted into the bushing arrangement 72*e*, and the bushing portion 74*e* of the bushing arrangement 72*e* and the input shaft 40*e* inserted through the aperture 81*e*, and the bushing arrangement 72*e* is secured to the sidewall 80*e* via bolts 82*e*. In the illustrated example, an end bore 120*e* of the input shaft 40*e* rotationally receives an engagement portion 122*e* of the output shaft 54*e*. It is noted that the configuration of the output shaft 54*e* in the instant embodiment allows the output shaft 54*e* to be cold forged thereby increasing the relative strength of the output shaft 54*e*.

In operation, the landing leg assembly 20*e* is operable between a high gear, low torque configuration where a third spline 164 of the input shaft 40*e* engages a fourth spline 166 of the out shaft 54*e* and the second portion 44*e* of the spur input gear 42*e* does not engage the first idler gear 50*e*, and a low gear, high torque configuration wherein the input shaft 40*e* is moved in a linear direction 124*e* until the first portion 44*e* of the spur input gear 42*e* engages the first idler gear 50*e* and the third spline 164 is withdrawn from engagement with the fourth spline 166.

Figure 21:
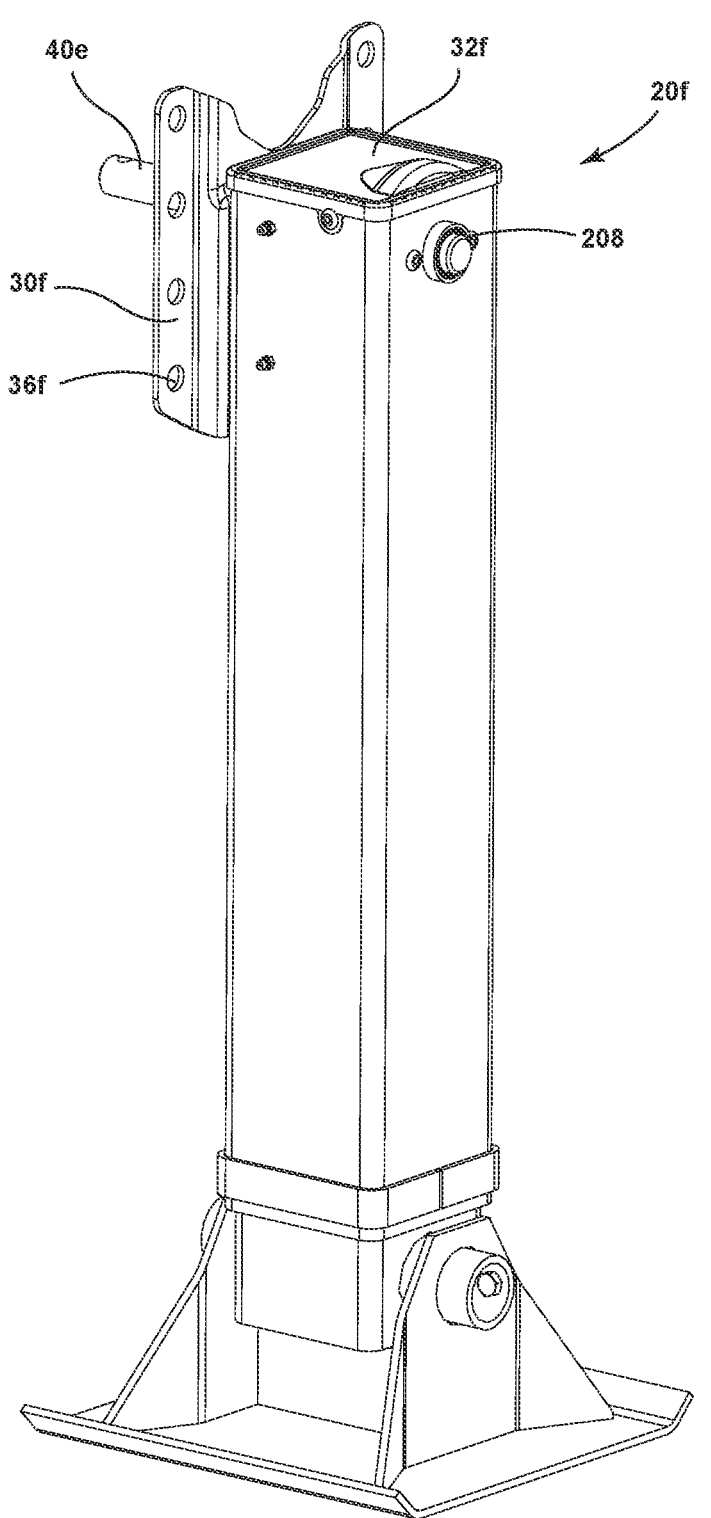
FIG. 21 is a perspective view of an additional alternative embodiment of the landing gear assembly.
Figure 22:
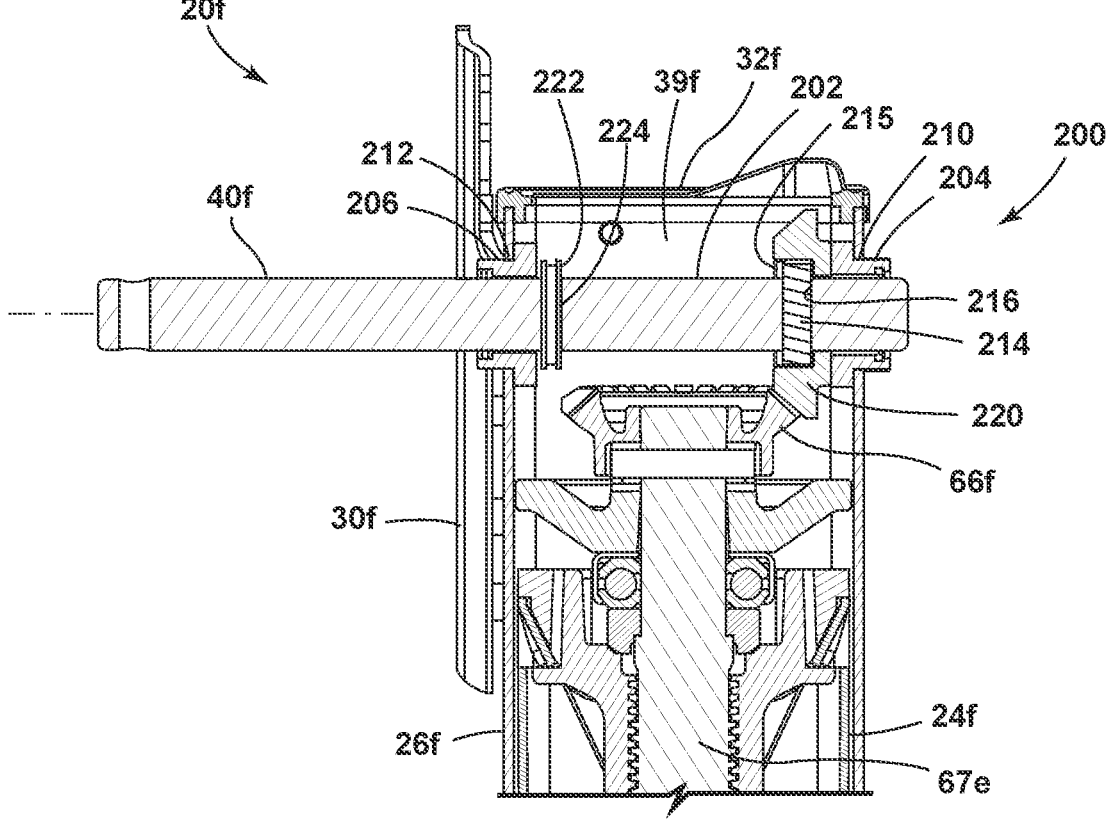
FIG. 22 is a cross-sectional side elevation view of a gear assembly of the embodiment of the landing gear shown in FIG. 21.
Figure 23:
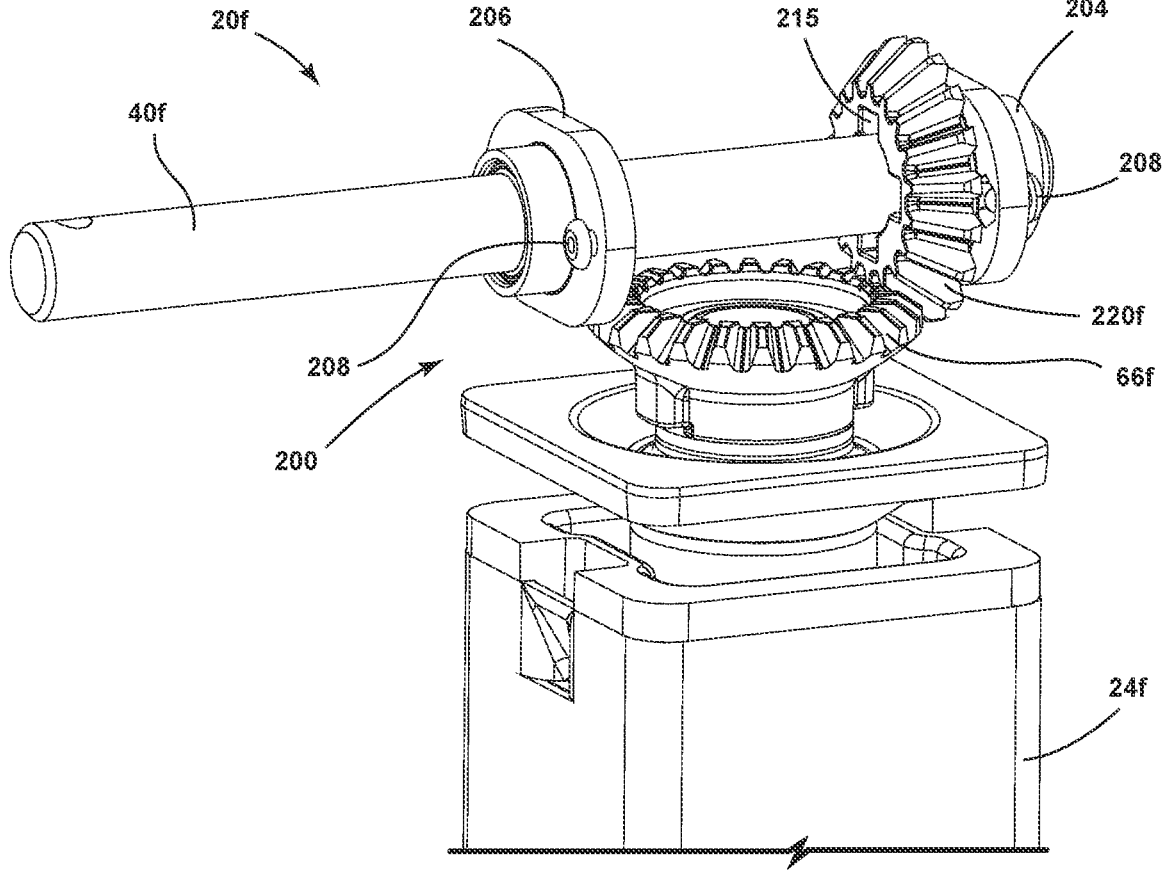
FIG. 23 is a perspective view of the gear assembly of FIG. 22.

The reference numeral 20*f* (FIGS. 21-23) generally designates another embodiment of the landing gear assembly. Since the landing gear assembly 20*f* is similar to the landing gear assembly 20, similar parts appearing in FIGS. 1-5 and FIGS. 21-23 respectively are represented by the same, corresponding reference numeral, except for the suffix "f" in the numerals of the latter. In the illustrated example, the landing gear assembly 20*f* includes a single-speed gear arrangement 200 including an input shaft 202 supported within the interior space 39*f* of the upper leg member 26*f* by a first bushing assembly 204 and a second bushing assembly 206 each secured to the upper leg member 26*f* by associated rivets 208 within respective apertures 210, 212. In assembly, the bushing assembly 204 is secured within the aperture 210 and the bushing 206 within the aperture 212 via the rivets 208. The input shaft 40f is then extended through the bushing 206, and a locking pin 214 is inserted into a locking pin aperture 216 of the input shaft 40f. The input shaft 40f is then further extended through the bushing 206 until the input shaft extends through the bushing 204 and the locking pin 214 is received within a mating slot 215 of a beveled output gear member 220, where the beveled output gear member 220 is configured to drive the output beveled gear 66f. An engagement pin 222 is then inserted into an engagement pin aperture 224, such that the locking pin 214 and the engagement pin 222 prevent removal of the input shaft 40f.

In the foregoing description, it will be readily appreciated by those skilled in the art that modifications may be made to the embodiments as disclosed herein without departing from the concepts as disclosed herein. Such modifications are to be considered as included in the following claims, unless these claims by their language expressly state otherwise.

The invention claimed is:

1. A landing gear assembly configured to support a trailer, comprising:
  a leg assembly including a first leg member and a second leg member telescopingly received within the first leg member and adjustable between a retracted position and an extended position;
  a gear assembly operably coupled to the leg assembly and configured to move the first leg member between the retracted and extended positions, wherein the gear assembly includes a first shaft member and a first gear where the first shaft member and the first gear are a single, integral piece;
  a first bushing member including a bushing portion having a bushing portion and a closed end and rotatably supporting a first end of the first shaft member within the first leg member; and
  a second bushing member including a bushing portion having a bushing portion and a closed end and rotatably supporting a second end of the first shaft member within the first leg member.

2. The landing gear assembly of claim 1, wherein the first bushing member is attached to the first leg member via at least one first mechanical fastener.

3. The landing gear assembly of claim 2, wherein the at least first mechanical fastener includes at least one bolt.

4. The landing gear assembly of claim 2, wherein the first bushing member is attached to an outer surface of the first leg member.

5. The landing gear assembly of claim 2, wherein the second bushing member is attached to the first leg member via at least one second mechanical fastener.

6. The landing gear assembly of claim 1, wherein the first bushing member is a single, integral piece.

7. The landing gear assembly of claim 6, wherein the first bushing member directly supports the first end of the first shaft member.

8. The landing gear assembly of claim 6, wherein the second bushing member is a single, integral piece.

9. The landing gear assembly of claim 8, wherein the first bushing member and/or the second bushing member directly supports the first shaft member.

10. The landing gear assembly of claim 1, wherein the gear assembly further includes a second gear, where the first shaft member and the second gear are a single, integral piece.

11. A method of assembling a landing gear assembly configured to support a trailer, comprising:
  providing a leg assembly including a first leg member and a second leg member telescopingly received within the first leg member and adjustable between a retracted position and an extended position, the first leg member having an open end, a first aperture extending through a first sidewall and a second aperture extending through a second sidewall;
  providing a gear assembly that includes a first shaft member and a first gear where the first shaft member and the first gear are a single, integral piece, wherein the gear assembly is configured to move the second leg member between the retracted and extended positions;
  positioning the first shaft member and first gear within the first leg member by passing the first shaft member and first gear through the open end of the first leg member, extending a first end of the first shaft member through the first aperture and extending a second end of the first shaft member through the second aperture;
  providing a bushing member that includes a bushing portion having a closed end and a plate portion extending outwardly from the bushing portion;
  attaching the first bushing member to the first wall of the first leg member such that the first bushing member rotatably supports the first end of the first shaft member;
  providing a second bushing member that includes a bushing portion having a closed end and a plate portion extending outwardly from the bushing portion; and
  attaching the second bushing member to the second wall of the first leg member such that the second bushing member rotatably supports the second end of the first shaft member.

12. The method of claim 11, wherein the first bushing member is attached to the first leg member via at least one first mechanical fastener.

13. The method of claim 12, wherein the at least first mechanical fastener includes at least one bolt.

14. The method of claim 12, wherein the first bushing member is attached to an outer surface of the first sidewall.

15. The method of claim 12, wherein the second bushing member is attached to the first leg member via at least one second mechanical fastener.

16. The method of claim 1, wherein the first bushing member is attached to an outer surface of the first sidewall.

17. The method of claim 11, wherein the first bushing member is a single, integral piece.

18. The method of claim 11, wherein the first bushing member directly supports the first end of the first shaft member.

19. The method of claim 18, wherein the second bushing member directly supports a second end of the first shaft member.

20. The method of claim 11, wherein the gear assembly further includes a second gear, where the first shaft member and the second gear are a single, integral piece.

* * * * *